(12) United States Patent
Hamilton et al.

(10) Patent No.: US 7,920,233 B2
(45) Date of Patent: Apr. 5, 2011

(54) TRANSFLECTIVE VERTICALLY ALIGNED LIQUID CRYSTAL DISPLAY WITH IN-CELL PATTERNED QUARTER-WAVE RETARDER

(75) Inventors: Rick Hamilton, Southampton (GB); Richard Harding, Hants (GB)

(73) Assignee: Merck Patent GmbH, Darmstadt (DE)

( * ) Notice: Subject to any disclaimer, the term of this patent is extended or adjusted under 35 U.S.C. 154(b) by 808 days.

(21) Appl. No.: 11/719,178

(22) PCT Filed: Oct. 19, 2005

(86) PCT No.: PCT/EP2005/011237
§ 371 (c)(1),
(2), (4) Date: May 11, 2007

(87) PCT Pub. No.: WO2006/050793
PCT Pub. Date: May 18, 2006

(65) Prior Publication Data
US 2009/0073352 A1  Mar. 19, 2009

(30) Foreign Application Priority Data
Nov. 12, 2004 (EP) ................. 04026992

(51) Int. Cl.
*G02F 1/1335* (2006.01)
*G02F 1/1337* (2006.01)

(52) U.S. Cl. ....................... 349/114; 349/130

(58) Field of Classification Search .......... 349/114, 349/129–130
See application file for complete search history.

(56) References Cited

U.S. PATENT DOCUMENTS

| 7,218,363 | B2 * | 5/2007 | Ozawa et al. | 349/114 |
|---|---|---|---|---|
| 2003/0160928 | A1 | 8/2003 | Ozawa et al. | |
| 2004/0032552 | A1 | 2/2004 | Kim | |
| 2004/0075791 | A1 | 4/2004 | Liu | |
| 2004/0105059 | A1 * | 6/2004 | Ohyama et al. | 349/114 |
| 2004/0125292 | A1 | 7/2004 | Maeda | |
| 2006/0177605 | A1 | 8/2006 | Lub et al. | |

FOREIGN PATENT DOCUMENTS

| WO | WO 03/019276 A2 | 3/2003 |
|---|---|---|
| WO | WO 2004/083913 | 9/2004 |
| WO | WO 2004/083943 A | 9/2004 |
| WO | WO 2004083913 A1 | 9/2004 |

OTHER PUBLICATIONS

Doornkamp C. et al., Late-News Poster: Novel Transflective LCD With Ultra-Wide Viewing Angle, SID International Symposium Digest of Technical Papers, May 25, 20-27, 2004, p. 3, vol. 35, Seattle WA.

K. Ohmuro et al., "Development of Super-High-Image-Quality Vertical-Alignment-Mode LCD," *SID 97 Digest*, 1997, pp. 845-848, 33.3, ISSN0097-0966X/97/2801, SID.

(Continued)

*Primary Examiner* — James A Dudek
(74) *Attorney, Agent, or Firm* — Millen, White, Zelano & Branigan, P.C.

(57) ABSTRACT

The invention relates to a transflective vertically aligned (VA) liquid crystal display (LCD) comprising a patterned quarter wave foil (QWF). The display (10) comprises, in a particular, front and back electrodes (14a, 14b, 14c) provided on transparent substrates (11a, 11b) and sandwiching a LC medium (12), so as to define reflective (10a) and transmissive sub-pixels (10b). The patterned QWF (16), which is preferably provided inside the LC cell (in-cell application), has regions (16a) which provide a defined retardation and cover the reflective sub-pixels (10a), and regions (16b) having no on-axis retardation and covering the transmissive sub-pixels (10a).

21 Claims, 21 Drawing Sheets

OTHER PUBLICATIONS

Hagen H. H. Klausman et al., "Optical characterization of the in-plane switching effect utilizing multidomain structures," Journal of Applied Physics, Feb. 15, 1998, pp. 1854-1862, vol. 83, No. 4, American Institute of Physics.

Shin-Tson Wu, "Reflective & Transflective Liquid Crystal Display," SID Seminar M-8, May 24, 2004, pp. M-8/3-M-8/18, School of Optics/CREOL/FPCE, University of Central Florida.

Heume-II Baek et al., "New Design of Transflective LCD with single retardation film," IDW, 2000, pp. 41-43, LCT2-2.

Masumi Kubo et al., "Development of Advanced TFT with Good Legibility Under Any Intensity of Ambient Light," IDW, 1999, pp. 183-186, AMD3-4.

S.J. Roosendaal et al., "Novel High Performance Transflective LCD with a Patterned Retarder," SID 03 Digest, 2003, pp. 78-81, 8.1, ISSN/0003-0966X/03/3401-0078, SID.

B.M.I. Van Der Zander et al., "Technologies Towards Patterned Optical Foils," SID 03 Digest, 2003, pp. 194-197, 14.2, ISSN/0003-0966X/03/3401-0194, SID.

"Technical Description," Figures 1-3 and Product Lineup as of Oct. 2003.

Lueder E., "Liquid Crystal Displays: Addressing Schemes and Electro-Optical Effects", John Wiley & Sons Ltd., 2001, pp. 43-44, ISBN 0471490296.

* cited by examiner

TRANSFLECTIVE VERTICALLY ALIGNED LIQUID CRYSTAL DISPLAY WITH IN-CELL PATTERNED QUARTER-WAVE RETARDER

FIELD OF THE INVENTION

The invention relates to a transflective vertically aligned (VA) liquid crystal display (LCD) comprising a patterned quarter wave foil (QWF).

BACKGROUND AND PRIOR ART

The demand for colour mobile displays that are thin, light weight, low power, but clear and bright in all ambient light conditions has been increasing due to the increasing popularity of mobile phones, personal digital assistants (PDAs), digital cameras and laptop computers. The fact that these devices are required to work in varied ambient conditions and need high battery power has raised interest in transflective colour liquid crystal displays, which use a backlight to illuminate the display, but can reduce power consumption by making use of the ambient light in bright conditions.

In prior art transflective displays of twisted and non-twisted modes like TN (twisted nematic) and ECB (electrically controlled birefringence) are disclosed, wherein each pixel is split into a reflective and a transmissive subpixel (see for example Kubo et al., IDW 1999, page 183-187; Baek et al., IDW 2000, page 41-44; Roosendaal et al., SID Digest 2003, page 78-81 and WO 03/019276 A2). The transmissive subpixel has transparent front and back electrodes whereas the reflective subpixel has a transmissive front electrode and a reflective back electrode, requiring a patterned electrode structure which is achieved for example by "hole-in-mirror" technology.

As the transmissive mode uses half-wave ($\lambda/2$) optical modulation ($\lambda$=wavelength of incident light) and the reflective mode uses quarter wave ($\lambda/4$) optical modulation it was suggested to use a different cell gap (or LC layer thickness) for the subpixels, so that the reflective subpixel has about half the cell gap of the transmissive subpixel.

In order to make the reflective sub-pixel work with the transmissive subpixel, an achromatic (or "wide-band") quarter wave foil (AQWF) is required to produce circularly polarised light (an AQWF exhibits an optical retardation of $\lambda/4$ for a wide wavelength band preferably encompassing the entire visible spectrum, and is formed for example by combining a QWF with a half wave foil (HWF, having an optical retardation of $\lambda/2$)). The AQWF also covers the transmissive pixel, hence requiring that an equivalent AQWF is placed on the backlight side of the cell.

However, the use of circularly polarised light in the transmissive portion of the display has the disadvantageous side-effect that twisted LC modes are less efficient at converting circular polarised light to the opposite handedness, thus reducing the brightness of the display and making the 90° twisted mode less effective.

To address the problems with circularly polarised light in the transmissive portion of the transflective display, it was proposed to use a patterned QWF having a pattern of areas with QWF retardation covering the reflective subpixels and non-retarding areas covering the transmissive subpixels (WO 03/019276; Van der Zande et al., Proceedings of the SID 2003, page 194-197). This allows the reflective and transmissive subpixels to be optimised separately and hence allows the use of linearly polarised light in the transmissive portion.

It has also been proposed, for example in US 2004/0075791 A1, US 2004/0032552 A1 and US 2003/0160928 A1, to use transflective displays of the vertically aligned (VA) mode.

Displays of the VA mode typically comprise an LC medium with negative dielectric anisotropy $\Delta \in$ that has homeotropic orientation in the undriven state and is switched into planar orientation when an electric field is applied. In multidomain VA (MVA) displays the LC cell is additionally divided into multiple, typically four, perpendicular domains where (in the field-on state) the LC director is oriented into different directions, thereby providing symmetrical viewing angle characteristics and good colour performance. Multiple domains in MVA-LCDs can be formed by various methods, e.g. using patterned alignment layers, specific cell surface structures or electrodes with slots or adding polymeric material to the LC medium.

A transflective VA-LCD also requires an AQWF (i.e. QWF plus HWF) to work both in the reflective and transmissive mode. However, the presence of the AQWF leads to a reduced viewing angle and increased chromaticity. As an AQWF is also needed at the backlight side to give good transmissive and reflective performance, another drawback are increased manufacturing costs because at least four films are required: a QWF and HWF at the viewer's side and a QWF and HWF at the backlight side.

Hence, there is still a need for transflective displays that do not have the drawbacks of prior art displays described above.

It was an aim of the present invention to provide a transflective display that does not have the above mentioned disadvantages, shows high contrast, good brightness and low colour shift over a large range of viewing angles and is easy to manufacture in a time- and cost-effective way. Other aims of the present invention are immediately evident to the person skilled in the art from the following detailed description.

The inventors of the present invention have found that these aims can be achieved by providing transflective VA-LCDs as claimed in the present invention, comprising a patterned QWF inside the LC cell that improves the display performance and in particular produces reduced chromaticity in the reflective mode. Furthermore, by appropriate selection of the arrangement and orientation of the optical components in the display the optical performance, especially chromaticity, contrast and brightness can be improved.

DEFINITION OF TERMS

The term 'film' includes rigid or flexible, self-supporting or free-standing films with mechanical stability, as well as coatings or layers on a supporting substrate or between two substrates.

The term 'liquid crystal or mesogenic material' or 'liquid crystal or mesogenic compound' means materials or compounds comprising one or more rod-shaped, board-shaped or disk-shaped mesogenic groups, i.e. groups with the ability to induce liquid crystal (LC) phase behaviour. LC compounds with rod-shaped or board-shaped groups are also known in the art as 'calamitic' liquid crystals. LC compounds with a disk-shaped group are also known in the art as 'discotic' liquid crystals. The compounds or materials comprising mesogenic groups do not necessarily have to exhibit an LC phase themselves. It is also possible that they show LC phase behaviour only in mixtures with other compounds, or when the mesogenic compounds or materials, or the mixtures thereof, are polymerised.

For the sake of simplicity, the term 'liquid crystal material' is used hereinafter for both mesogenic and LC materials.

Polymerisable compounds with one polymerisable group are also referred to as 'monoreactive' compounds, compounds with two polymerisable groups as 'direactive' compounds, and compounds with more than two polymerisable groups as 'multireactive' compounds. Compounds without a polymerisable group are also referred to as 'non-reactive' compounds.

The term 'reactive mesogen' (RM) means a polymerisable mesogenic or liquid crystal compound.

The term 'director' is known in prior art and means the preferred orientation direction of the long molecular axes (in case of calamitic compounds) or short molecular axis (in case of discotic compounds) of the mesogenic groups in an LC material.

In films comprising uniaxially positive birefringent LC material the optical axis is given by the director.

The term 'homeotropic structure' or 'homeotropic orientation' refers to a film wherein the optical axis is substantially perpendicular to the film plane.

The term 'planar structure' or 'planar orientation' refers to a film wherein the optical axis is substantially parallel to the film plane.

The term 'A plate' refers to an optical retarder utilizing a layer of uniaxially birefringent material with its extraordinary axis oriented parallel to the plane of the layer.

The term 'C plate' refers to an optical retarder utilizing a layer of uniaxially birefringent material with its extraordinary axis perpendicular to the plane of the layer.

In A- and C-plates comprising optically uniaxial birefringent liquid crystal material with uniform orientation, the optical axis of the film is given by the direction of the extraordinary axis.

An A plate or C plate comprising optically uniaxial birefringent material with positive birefringence is also referred to as '+A/C plate' or 'positive A/C plate'. An A plate or C plate comprising a film of optically uniaxial birefringent material with negative birefringence is also referred to as '−A/C plate' or 'negative A/C plate'.

"E-mode" refers to a twisted nematic liquid crystal display (TN-LCD) where the input polarisation direction is substantially parallel to the director of the LC molecules when entering the display cell, i.e. along the extraordinary (E) refractive index. "O-mode" refers to a TN-LCD where the input polarisation is substantially perpendicular to the director when entering the display cell, i.e. along the ordinary (O) refractive index.

Unless stated otherwise, the term "polarisation direction" of a linear polariser means the polariser extinction axis. In case of stretched plastic polariser films comprising e.g. dichroic iodine based dyes the extinction axis usually corresponds to the stretch direction.

SUMMARY OF THE INVENTION

The invention relates to a transflective vertically aligned (VA) liquid crystal display (LCD) comprising one or more pixels that are divided into a reflective and a transmissive subpixel and comprise
    an LC cell comprising front and back electrode layers sandwiching an LC layer that is switchable between different orientations upon application of an electric field, said electrodes preferably being provided on the inside of transparent substrates,
    front and back polarisers sandwiching the LC cell and having front and back polarisation directions,
characterized in that it comprises
    at least one quarter wave retardation film (QWF) being positioned between the front polariser and the LC layer, having a pattern of regions with quarter wave (λ/4) retar-
dation and regions with substantially no retardation and being arranged such that the λ/4-regions do essentially cover only the reflective subpixels.

DETAILED DESCRIPTION OF THE INVENTION

Figure 1:
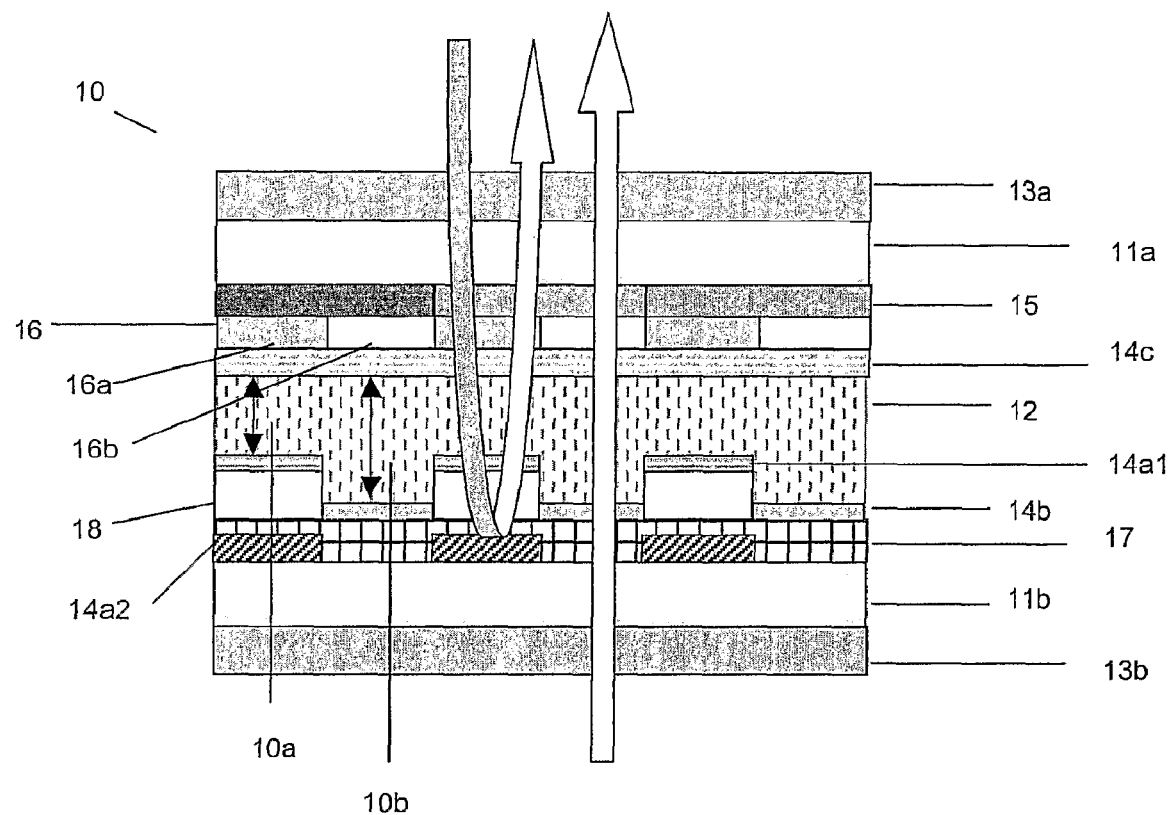
FIG. 1 shows a transflective VA-LCD according to the present invention.

A preferred LCD according to the invention comprises
    a liquid crystal (LC) cell comprising the following elements
        a first and a second substrate plane parallel to each other, at least one of which is transparent to incident light,
        an array of nonlinear electric elements on one of said substrates which can be used to individually switch individual pixels of said LC cell, said elements being preferably active elements like transistors, very preferably TFTs,
        a colour filter array provided on one of said substrates, preferably on the substrate opposite to that carrying the array of nonlinear elements, and having a pattern of different pixels transmitting one of the primary colours red, green and blue (R, G, B), said colour filter optionally being covered by a planarisation layer,
        a first electrode layer provided on the inside of said first substrate,
        a second electrode layer provided on the inside of said second substrate,
        optionally first and second alignment layers provided on said first and second electrodes,
        an LC medium that is switchable between at least two different orientations by application of an electric field,
    a first linear polariser on the first side of the LC cell,
    a second linear polariser on the second side of the LC cell, and
    at least one patterned QWF positioned between the first and second substrate of the LC cell, having a pattern of regions having different retardation and/or orientation,
wherein the orientation directions of the polarisers, QWF and LC layer are as defined above and below.

In the transflective VA display the LC layer preferably comprises an LC medium with negative dielectric anisotropy Δε. The LC medium in the field-off state has a substantially homeotropic director orientation. Upon application of an electric field it is preferably switched into a tilted planar orientation.

In a transflective VA-LCD according to the present invention, the QWF and HWF of an AQWF doublet are replaced with patterned film(s), for example with a patterned QWF, or with a patterned QWF and a patterned HWF, such that a region with QWF or AQWF retardation is produced over the reflective sub-pixels and a region with no on-axis retardation is produced over the transmissive sub-pixels.

In the retarding regions of the patterned (A)QWF the optical axis is preferably parallel to the film plane (A-plate symmetry). The non-retarding regions of the patterned (A)QWF comprise for example an optically isotropic material, or have an optical axis perpendicular to the film plane (C-plate symmetry).

In a transflective LCD according to the present invention the patterned retardation film is preferably provided between the substrates forming the switchable LC cell and containing the switchable LC medium ("incell" application). Compared to conventional displays where optical retarders are usually placed between the LC cell and the polarisers, incell application of an optical retardation film has several advantages. For example, a display where the optical film is attached outside of the glass substrates forming the LC cell usually suffers from parallax problems, which can severely impair viewing angle properties. If the retardation films is prepared inside the LC display cell, these parallax problems can be reduced or even avoided.

Preferably the incell retardation film is positioned between the colour filter and the LC medium, very preferably between the colour filter and the corresponding proximate electrode layer, or if a planarisation layer is present, between the colour filter and the planarisation layer.

The thickness of the incell QWF and HWF is preferably from 0.5 to 3.5 microns, very preferably from 0.6 to 3 microns, most preferably from 0.7 to 2.5 microns.

The on-axis retardation (i.e. at 0° viewing angle) of the incell QWF is preferably from 90 to 200 nm, most preferably from 100 to 175 nm.

The on-axis retardation (i.e. at 0° viewing angle) of the incell HWF is preferably from 180 to 400 nm, most preferably from 200 to 350 nm.

Alternatively or in addition to an incell HWF it is also possible to apply an HWF outside the LC cell.

The assembly of an LCD according to a preferred embodiment of the present invention is schematically depicted in FIG. 1. The top of FIG. 1 corresponds to the front side of the display, i.e. the side of the viewer. The bottom of FIG. 1 to the back side of the display, i.e. the side of the backlight. FIG. 1 exemplarily shows one pixel 10 of the LCD, comprising a layer of a switchable LC medium 12 confined between two transparent, plane parallel substrates 11a/b, like for example glass substrates, and two polarisers 13a/b with crossed polarisation directions sandwiching the substrates.

The display further comprises a transparent electrode 14c on the front side of the LC layer and a pattern of reflective electrodes 14a and transparent electrodes 14b on the back side of the LC layer, thereby forming two sets of reflective subpixels 10a and transmissive subpixels 10b. The transparent electrodes 14c/14b are for examples layers of Indium Tin Oxide (ITO). The reflective electrode 14a comprises for example an ITO layer 14a1 and a reflective layer 14a2 which redirects light transmitted through the LC medium back towards the viewer (indicated by the curved arrow). The reflective layer 14a2 is for example a metal layer (e.g. Al) or can be formed as a mirror with holes (the mirror areas being in the reflective subpixels and the holes in the transmissive subpixels). The electrode layer 14a1 and the mirror 14a2 can be adjacent layers, or spatially separated as shown in FIG. 1.

The display further comprises a colour filter 15 with red, green and blue pixels and a patterned incell retardation film 16. The incell retarder 16 has a pattern of regions 16a having a defined retardation (with a value <0 or >0) and regions 16b having no on-axis retardation. The retarding regions 16a cover the reflective subpixels 10a and the non-retarding regions 16b cover the transmissive subpixels 10b.

If the display is of the active-matrix type, as shown in FIG. 1, it also comprises an array of nonlinear electric elements 17 which are used to individually switch individual pixels, like for example TFTs, on one side of the LC cell, preferably on the side opposite to that of the colour filter 15. It is possible that the TFT layer 17 is on the back side and the colour filter 15 on the front side, as shown in FIG. 1, or vice versa.

In colour active matrix displays, the mirror 14a2 can be built for example on the TFT layer (if the colour filter is on the front substrate) or on the colour filter layer (if the TFT layer is on the front substrate).

The reflective and transmissive subpixels 10a/b preferably have different cell gaps, as indicated by the double arrows in FIG. 1. Preferably the cell gap of the transmissive subpixel 10b is two times the cell gap of the reflective subpixel 10a.

To achieve a different cell gap, the reflective subpixel comprises for example a step 18 which can be formed e.g. from a clear resin (like a photoresist). The step 18 can be present on the colour filter side of the LC layer, or on the side of the LC layer opposite to that of the colour filter as shown in FIG. 1.

The electrodes 14a/b/c may also be covered by alignment layers (not shown) to induce or enhance the desired surface alignment in the LC medium 12. Optionally there is also an alignment layer (not shown) provided between the colour filter 15 and the patterned incell retardation film 16. The display also comprises a backlight (not shown) on its back side.

In a preferred embodiment of the present invention the VA LCD is a multi-domain VA (MVA) display, wherein the transmissive subpixels are subdivided into multiple, for example four, domains having different orientation direction of the LC director in the field-on state, leading to improved viewing angle characteristics. Suitable means and methods how to achieve multidomain alignment are known to the expert and described in prior art. For example, multidomain alignment can be achieved by using a specific surface structure, preferably a square-based pyramid structure, which tilts the LC molecules in the preferred direction, or by using offset electrodes which create an electric field in a direction tilted away from the perpendicular direction, so that the LC molecules will align in the desired off-axis direction. For example, in an VA-LCD as shown in FIG. 1 the transmissive subpixel may comprise four domains with orientation directions (in the field-on state) of 45°, 135°, 225° and 315°.

As the VA-LCD according to the present invention is a transflective display it can operate both in a reflective and transmissive mode. The operation of an LCD according to the present invention and as shown in FIG. 1 is exemplarily described below.

By virtue of the patterned retarder used in this invention, the transmissive part of the display can operate like a standard transmissive VA display. In the low voltage dark state, the light emitted from the backlight is polarised by the back polariser, passes unchanged through the homeotropically aligned LC cell, and is blocked by the front polariser which is orientated with its extinction axis perpendicular to that of the back polariser. In the voltage driven bright state, the electric field acts upon the negative dielectric anisotropy of the LC molecules, causing them to tilt towards the plane in a preferential direction, usually 45°, 135°, 225° and 315° from the extinction axis of the front and back polarisers. This shift in the on-axis birefringence results in an effective retardation through the thickness of the cell, which changes the state of polarised light from linear through elliptical to linear polarised orientated ±90° to the back polarisation direction, allowing light to pass through the front polariser.

The reflective state requires the generation of circularly polarised light by use of single patterned QWF or by use of an AQWF that is formed e.g. from a patterned QWF and standard HWF or from a dual patterned QWF and HWF. In the non-driven dark state, the circularly polarised light passes through the cell unchanged where it is reflected and changed to the opposite handedness, so that when it passes back through the cell unchanged, the QWF or AQWF will convert it to linearly polarised light orientated perpendicular to the transmission axis of the front polariser, giving the dark state. In the driven bright state, the cell now has some on-axis retardation and will subsequently convert the circularly polarised light produced by the QWF or AQWF to elliptical through to linear polarised, at which point the light will reflect from the mirror unchanged and be converted back to circular polarised, of the same handedness as when it entered, and then converted back to linear of the same orientation as the transmission axis of the top polariser, giving the bright state.

In VA-LCDs according to the present invention preferably the optical layers, including polarisers, LC cell, QWF and optional further retardation films, are arranged such that their optial axes have specific orientation directions relative to each other. This reduces the chromaticity in the reflective mode caused by the single (chromatic) QWF, so that an additional HWF is not necessary and the number of optical films can be reduced.

Figure 2:
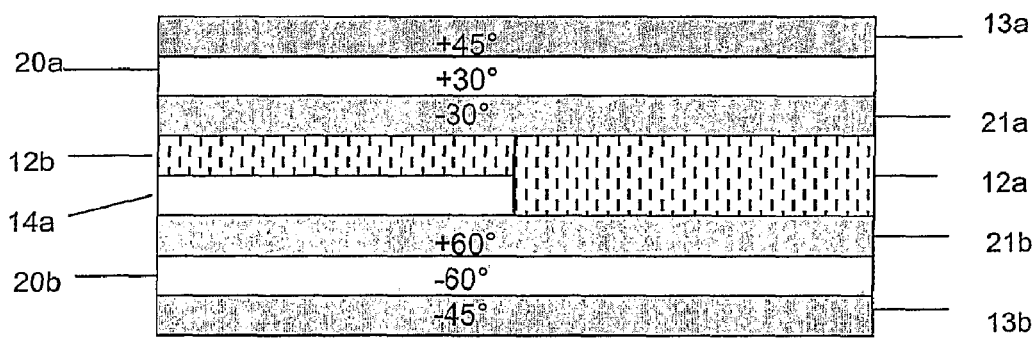
FIG. 2 shows the relative orientation of optical layers in a transflective VA-LCD according to prior art.

For comparison purpose, FIG. 2 shows a cross section of a typical stack of optical components in a transflective VA-LCD of prior art, including an LC layer divided into reflective subpixels 12a and transmissive subpixels 12b, a reflector 14a, front and back polarisers 13a/b, a front HWF 20a and front QWF 21a, and a back HWF 20b and back QWF 21b.

The directions of the extinction axes of the polarisers 13a/b are +45° and −45°, respectively, within the polariser film plane. The directions of the optical axes of the front HWF 20a and front QWF 21a are +30° and −30°, respectively, and the directions of the optical axes of the back HWF 20b and back QWF 21b are −60° and +60°, respectively.

Figure 3:
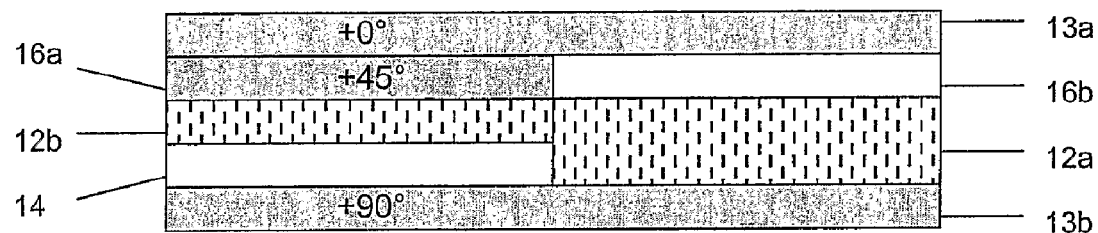
FIGS. 3-7 show the relative orientation of optical layers in transflective VA-LCDs according to preferred embodiments of the present invention.

FIG. 3 shows a cross section of the stack of optical components in a transflective VA-LCD according to a first preferred embodiment of the present invention, including an LC layer divided into reflective subpixels 12a and transmissive subpixels 12b, a reflector 14 (including reflector 14a2 and step 18 of FIG. 1), front and back polarisers 13a/b, and a patterned incell QWF 16 instead of the two HWFs (20a/b) and QWFs (21a/b). The patterned incell QWF 16 has a pattern of quarter wave regions 16a, covering the reflective subpixels, and optically isotropic regions 16b, covering the transmissive subpixels. The transmission axes of the polarisers 13a/b are oriented at 0° and +90°, respectively, and the optical axis of the QWF regions 16a is oriented at +45°.

Figure 4:
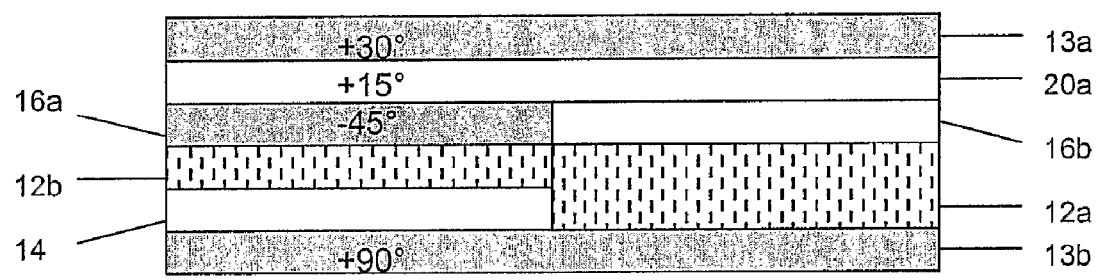

FIG. 4 shows a cross section of the stack of optical components in a transflective VA-LCD according to a second preferred embodiment of the present invention, including the components as shown in FIG. 3 and additionally comprising a front HWF 20a. The transmission axes of the polarisers 13a/b are oriented at +30° and +90°, respectively, the optical axis of the incell QWF regions 16a is oriented −45° and the optical axis of the front HWF 20a is oriented at +15°.

Figure 5:
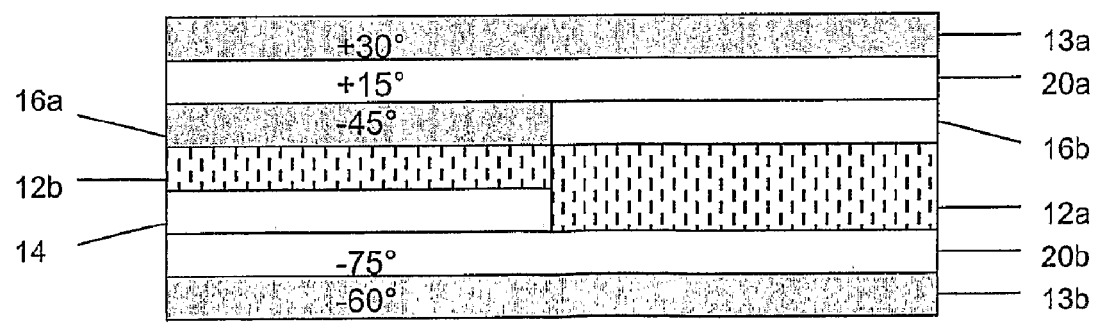

FIG. 5 shows a cross section of the stack of optical components in a transflective VA-LCD according to a third preferred embodiment of the present invention, including the components as shown in FIG. 4 and additionally comprising a back HWF 20b. The transmission axes of the polarisers 13a/b are oriented at +30° and −60°, respectively, the optical axis of the incell QWF regions 16a is oriented at −45° and the optical axes of the front and back HWF 20a/b are oriented at +15° and −75°, respectively.

Figure 6:
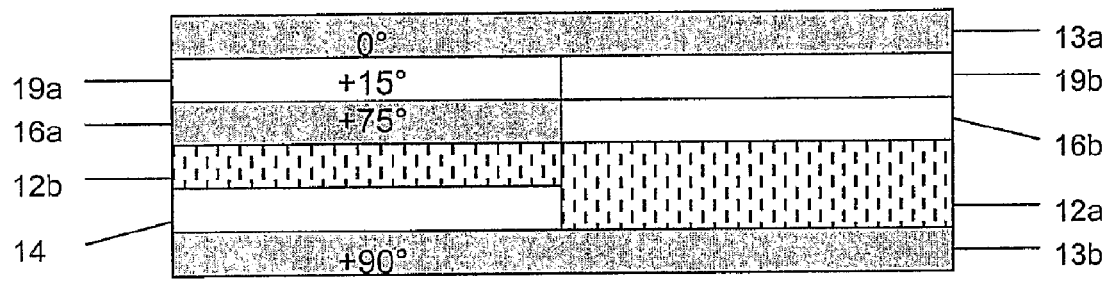

FIG. 6 shows a cross section of the stack of optical components in a transflective VA-LCD according to a fourth preferred embodiment of the present invention, including the components as shown in FIG. 3 and additionally comprising a patterned incell HWF 19. The patterned incell HWF 19 comprises a pattern of regions 19a having half wave retardation, covering the reflective subpixels, and optically isotropic regions 19b, covering the transmissive subpixels. The transmission axes of the polarisers 13a/b are oriented at 0° and +90°, respectively, the optical axis of the incell QWF regions 16a is oriented at +75°, and the optical axis of the incell HWF regions 19a is oriented at +15°.

Figure 7:
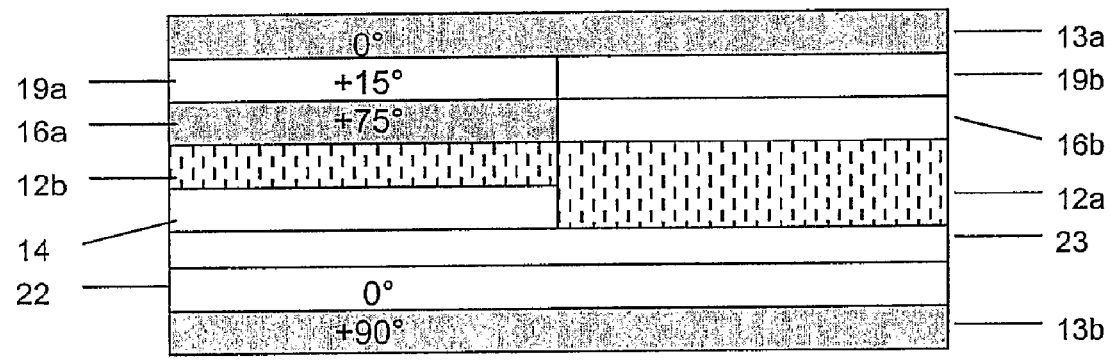

FIG. 7 shows a cross section of the stack of optical components in a transflective VA-LCD according to a fifth preferred embodiment of the present invention, including the components as shown in FIG. 6. The display additionally comprises a back −C plate retarder film 22 having an optical axis perpendicular to the film plane, and a back +A plate retarder film 23 having an optical axis parallel to the film plane. The transmission axes of the polarisers 13a/b are oriented at 0° and +90°, respectively, the optical axis of the incell QWF regions 16a is oriented at +75°, the optical axis of the incell HWF regions 19a is +15°, and the optical axis of the +A-plate 22 is oriented at 0°.

In another preferred embodiment, a biaxial negative C film is used instead of the +A-plate and −C-plate. Suitable and preferred biaxial negative C films are for example those disclosed in WO 03/054111, comprising a polymerised LC material having cholesteric structure with a deformed helix and a reflection wavelength below 380 nm. The biaxial film is preferably located at the backlight side of the stack, between the polariser 13b and the LC layer 12, so that it does not interfere with the reflective component.

In another preferred embodiment, the QWF additionally exhibits a pattern of R-, G- and B-pixels with three different retardations covering the reflective subpixels, wherein the retardation in the R-, G- and B-pixels of the film is selected such that the efficiency of converting linearly polarised light into circularly polarised light is optimised for the colour red (R), green (G) or blue (B), respectively. The QWF is positioned such that its R-, G- and B-pixels cover the corresponding reflective R-, G- and B-subpixels of the display.

In an R, G, B-pixelated QWF the retardation values in the R-, G- and B-pixels are preferably selected as follows:

For red light of a wavelength of 600 nm the retardation is from 140 to 190 nm, preferably 145 to 180 nm, very preferably 145 to 160 nm, most preferably 150 nm.

For green light of a wavelength of 550 nm the retardation is from 122 to 152 nm, preferably 127 to 147 nm, very preferably 132 to 142 nm, most preferably 137 nm.

For blue light of a wavelength of 450 nm the retardation is from 85 to 120 nm, preferably 90 to 115 nm, very preferably 100 to 115 nm, most preferably 112 nm.

In an R, G, B-pixelated HWF the retardation values in the R-, G- and B-pixels are preferably 2 times of the preferred values of the QWF as given above.

In the LCD according to the present invention, the linear polarisers (13a/b) are for example standard absorption polarisers comprising e.g. stretched, dye-doped plastic films. It is also possible to use linear polarisers comprising a polymerised LC material with uniform planar orientation and a dichroic dye absorbing visible light, as described for example in EP-A-0 397 263.

The A-plate is preferably a film of polymerised LC material with planar structure, for example as disclosed in WO 98/04651. The negative C-plate is preferably a film of polymerised LC material with short-pitch cholesteric structure and reflection in the UV range, as disclosed for example in WO 01/20393. However, it is also possible to use other A-plate and C-plate retarders known from prior art, for example as disclosed in U.S. Pat. No. 5,619,352, or biaxial films as disclosed in WO 03/054111.

The polarisers (13a/b) and the external retarders like HWF (20), QWF (21), A-plate (22) and C-plate (23) can be attached to the substrates (11a/b) by adhesive layers (not shown in the Figures), like commercially available PSA films (pressure sensitive adhesives).

In a preferred embodiment the QWF is an achromatic QWF (AQWF) (or broadband or wideband QWF), which converts linearly polarized light into circular polarized light over a broader wavelength band in the visible spectrum, preferably for all visible wavelengths. Preferably the AQWF according to this embodiment has a retardation that is substantially a quarter of the wavelength of light incident on said AQWF, when measured at a wavelength of 450 nm, 550 nm and 650 nm, respectively. The term "substantially a quarter of a wavelength" means that the ratio $r/\lambda$, wherein r is the retardation of the AQWF and $\lambda$ is the wavelength of light, is in the range from 0.2 to 0.3, preferably from 0.22 to 0.28, most preferably from 0.24 to 0.26. The retardation r is defined as $r=d\cdot(n_x-n_y)$, wherein d is the film thickness and $n_x$ and $n_y$ are the main refractive indices in the plane of the film.

As mentioned above, an AQWF can be formed for example by providing incell or external QWF and HWF layers directly adjacent to each other, or separated by one or more transparent, non-retarding layers (e.g. an adhesive layer). The AQWF can be prepared for example as described in EP-A-1 363 144, by combining a QWF and a HWF both comprising polymerised LC material with planar orientation, which are arranged parallel to each other such that their optical axes are oriented at an angle of from 40 to 80°, preferably from 55 to 65°, most preferably of 60° relative to each other.

The QWFs/HWFs are preferably films comprising polymerised LC material, optionally with a retardation and/or orientation pattern. These can be applied incell (i.e. inside the substrates forming the LC cell) to avoid parallax problems and patterned using UV light to form an isotropic region over the transmissive portion of the display. Principally any patterned retarder which is applicable incell can be used as QWF/HWF.

Unpatterned QWFs and HWFs comprising polymerised LC material are known in prior art and are described for example in EP-A-1363144.

Patterned retarders that are suitable for use in the LCD according to the present invention have been described in prior art. For example, the retarders disclosed in WO 03/019276 and Van der Zande et al., Proceedings of the SID 2003, p. 194-197 can be used.

Especially preferred are patterned optical retardation films as described in PCT/EP/2004/003547. Preferably the patterned film is prepared by a process comprising the following steps:
a) providing a layer of a polymerisable LC material comprising at least one photoisomerisable compound onto a substrate,
b) aligning the layer of LC material into planar orientation,
c) exposing the LC material in the layer, or in selected regions thereof, to photoradiation that causes isomerisation of the isomerisable compound, preferably UV radiation,
d) polymerising the LC material in at least a part of the exposed regions of the material, thereby fixing the orientation, and
e) optionally removing the polymerised film from the substrate, wherein the retardation and/or orientation of the LC material is controlled by varying the amount and/or type of the photoisomerisable compound, and/or by varying the intensity of the photoradiation and/or the exposure time.

Preferably the LC material is exposed to radiation that causes photoisomerisation and photopolymerisation, wherein the steps of photoisomerisation and photopolymerisation are carried out under different conditions, in particular under different gas atmospheres, especially preferably wherein photoisomerisation is carried out in the presence of oxygen and photopolymerisation is carried out in the absence of oxygen.

Especially preferred is a patterned film comprising polymerised liquid crystal (LC) material having at least two regions with different retardation and at least two regions with different orientation of the LC material, wherein said regions differing in retardation can also differ in orientation, or they can be different regions. Thus, for example the film has a pattern of a first and a second region, wherein the first and said second region differ in both retardation and orientation. In another embodiment the film has a pattern of a first, a second and a third region, wherein said first and second region differ in one of retardation and orientation, and said third region differs in at least one of retardation and orientation from at least one of said first and said second region. In another embodiment the film has a pattern of a first, a second, a third and a fourth region, each of which has a retardation different from each other region, and two of said regions have the same orientation. Other combinations are also possible.

Apart from the specific conditions and materials described in this invention, the steps a) to e) can be carried out according to standard procedures that are known to the expert and are described in the literature.

The polymerisable LC material comprises a photoisomerisable compound, preferably a photoisomerisable mesogenic or LC compound, very preferably a photoisomerisable compound that is also polymerisable. The isomerisable compound changes its shape, e.g. by E-Z-isomerisation, when exposed to radiation of a specific wavelength, e.g. UV-radiation. This leads to disruption of the uniform planar orientation of the LC material, resulting in a drop of its birefringence. Since the optical retardation of an oriented LC layer is given as the product $d\cdot\Delta n$ of the layer thickness d and the birefringence $\Delta n$ of the LC material, the drop in birefringence also causes a decrease of the retardation in the irradiated parts of the LC material. The orientation and retardation of the LC material is then fixed by in-situ polymerisation of the irradiated regions or of the entire film.

Polymerisation of the LC material is achieved for example by thermal or photopolymerisation. In case photopolymerisation is used, the type of radiation used for photoisomerisation and for photopolymerisation of the LC material may be the same or different. In case radiation, e.g. UV-radiation, of a wavelength is used that can cause both photoisomerisation and photopolymerisation of the LC material, the steps of photoisomerisation and photopolymerisation are preferably carried out under different conditions, in particular under different gas atmospheres. In this case preferably photoisomerisation is carried out in the presence of oxygen, like e.g. in air, and photopolymerisation is carried out in the absence of oxygen, especially preferably under an inert gas atmosphere of e.g. nitrogen or a noble gas like argon. If the isomerisation step is performed in the presence of oxygen or in air, the oxygen scavenges the free radicals produced from the photoinitiator present in the material and thus prevents polymerisation. In the next step oxygen or air is removed and replaced by an inert gas such as nitrogen or argon, thereby allowing polymerisation to occur. This allows better control of the process steps.

The degree of isomerisation and thus the birefringence change in the layer of LC material can be controlled e.g. by varying the radiation dose, i.e. the intensity, exposure time and/or power of the radiation. Also, by applying a photomask between the radiation source and the layer it is possible to prepare a film with a pattern of regions or pixels having specific values of the retardation that differ from each other. For example, a film comprised of two different values of retardation can be created using a simple, monochrome mask. A more complicated film exhibiting multiple regions of different retardation can be created using a grey-scale mask. After the desired retardation values are achieved the LC layer is polymerised. In this way it is possible to create a polymer retardation film with values of retardation ranging from that of the initial LC layer to zero. The value of retardation for the initial layer of LC material is controlled by appropriate selection of the layer thickness and the type and amounts of the individual components of the LC material.

The polymerisable LC material is preferably a nematic or smectic LC material, in particular a nematic material, and preferably comprises at least one di- or multireactive achiral RM and optionally one or more than one monoreactive achiral RMs. By using di- or multireactive RMs a crosslinked film is obtained wherein the structure is permanently fixed, and which exhibits high mechanical stability and high stability of the optical properties against external influences like temperature or solvents. Films comprising crosslinked LC material are thus especially preferred.

Polymerizable mesogenic mono-, di- and multireactive compounds used for the present invention can be prepared by methods which are known per se and which are described, for example, in standard works of organic chemistry such as, for example, Houben-Weyl, Methoden der organischen Chemie, Thieme-Verlag, Stuttgart.

Examples of suitable polymerizable mesogenic compounds that can be used as monomers or comonomers in a polymerizable LC mixture are disclosed for example in WO 93/22397, EP 0 261 712, DE 195 04 224, WO 95/22586, WO 97/00600 and GB 2 351 734. The compounds disclosed in these documents, however, are to be regarded merely as examples that shall not limit the scope of this invention.

Examples of especially useful polymerisable mesogenic compounds (reactive mesogens) are shown in the following lists which should, however, be taken only as illustrative and is in no way intended to restrict, but instead to explain the present invention:

(R1)

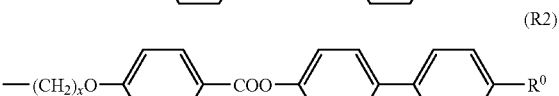
(R2)

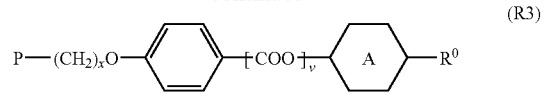
(R3)

(R4)

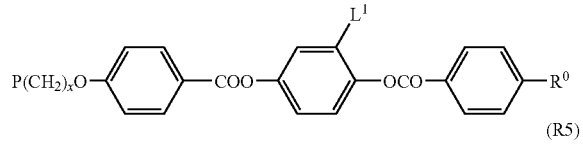
(R5)

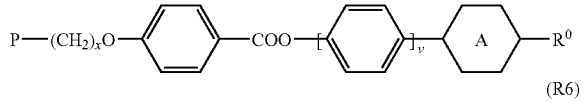
(R6)

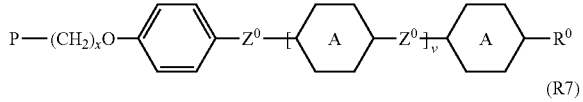
(R7)

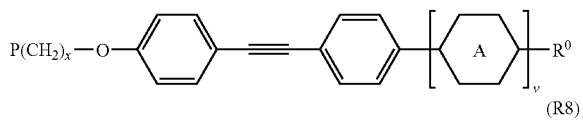
(R8)

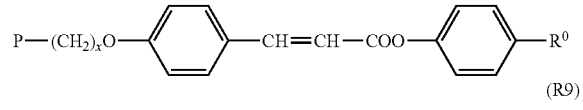
(R9)

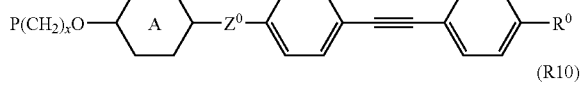
(R10)

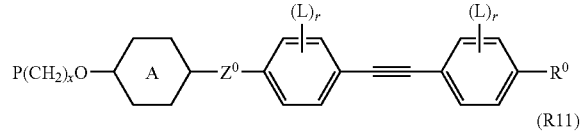
(R11)

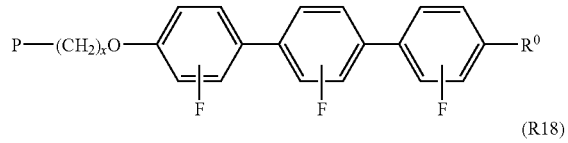
(R18)

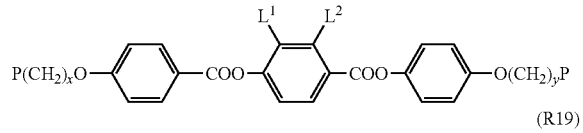
(R19)

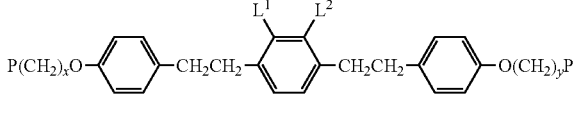

In the above formulae, P is a polymerisable group, preferably an acryl, methacryl, vinyl, vinyloxy, propenyl ether, epoxy, oxetane or styryl group, x and y are identical or different integers from 1 to 12, A is 1,4-phenylene that is optionally mono-, di- or trisubstituted by $L^1$, or 1,4-cyclohexylene, u and v are independently of each other 0 or 1, $Z^0$ is —COO—, —OCO—, —CH$_2$CH$_2$—, —CH=CH—, —C≡C— or a single bond, $R^0$ is a polar group or an unpolar group, L, $L^1$ and $L^2$ are independently of each other H, F, Cl, CN or an optionally halogenated alkyl, alkoxy, alkylcarbonyl, alkylcarbonyloxy, alkoxycarbonyl or alkoxycarbonyloxy group with 1 to 7 C atoms, and r is 0, 1, 2, 3 or 4. The phenyl rings in the above formulae are optionally substituted by 1, 2, 3 or 4 groups L.

The term 'polar group' in this connection means a group selected from F, Cl, CN, NO$_2$, OH, OCH$_3$, OCN, SCN, an optionally fluorinated alkycarbonyl, alkoxycarbonyl, alkylcarbonyloxy or alkoxycarbonyloxy group with up to 4 C atoms or a mono- oligo- or polyfluorinated alkyl or alkoxy group with 1 to 4 C atoms. The term 'unpolar group' means an optionally halogenated alkyl, alkoxy, alkycarbonyl, alkoxycarbonyl, alkylcarbonyloxy or alkoxycarbonyloxy group with 1 or more, preferably 1 to 12 C atoms which is not covered by the above definition of 'polar group'.

Especially preferred are mixtures comprising one or more polymerisable compounds comprising an acetylene or tolane group with high birefringence, like e.g. compounds of formula Ig above. Suitable polymerisable tolanes are described for example in GB 2,351,734.

Suitable photoisomerisable compounds are known in prior art. Examples of photoisomerisable compounds include azobenzenes, benzaldoximes, azomethines, stilbenes, spiropyrans, spirooxadines, fulgides, diarylethenes, cinnamates. Further examples are 2-methyleneindane-1-ones as described for example in EP 1 247 796, and (bis-)benzylidenecycloalkanones as described for example in EP 1 247 797.

Especially preferably the LC material comprises one or more cinnamates, in particular cinnamate reactive mesogens (RMs) as described for example in U.S. Pat. No. 5,770,107 (P0095421) and EP 02008230.1. Very preferably the LC material comprises one or more cinnamate RMs selected of the following formulae

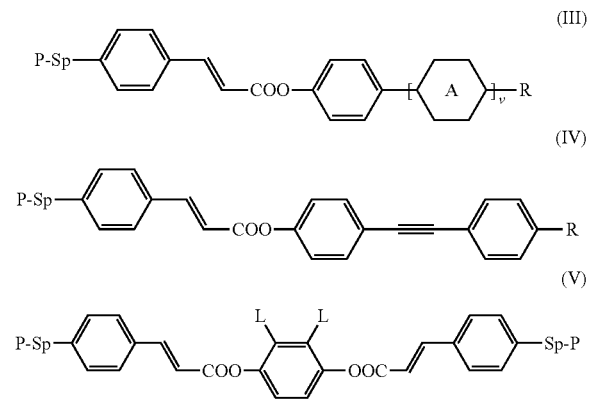

wherein P, A and v have the meanings given above, L has one of the meanings of L$^1$ as defined above, Sp is a spacer group, like for example alkylene or alkyleneoxy with 1 to 12 C-atoms, or a single bond, and R is Y or R$^0$ as defined above or denotes P-Sp.

Especially preferred are cinnamate RMs containing a polar terminal group Y as defined above. Very preferred are cinnamate RMs of formula III and IV wherein R is Y.

The photoradiation used to cause photoisomerisation in the LC material depends on the type of photoisomerisable compounds, and can be easily selected by the person skilled in the art. Generally, compounds that show photoisomerisation induced by UV-radiation are preferred. For example, for cinnamate compounds like those of formula III, IV and V, typically UV-radiation with a wavelength in the UV-A range (320-400 nm) or with a wavelength of 365 nm is used.

It was found that polymerisable LC materials containing a high amount of photoisomerisable compounds are especially useful to the purpose of the present invention, as these materials allow to easily control and adjust the retardation of the optical retardation film. For example, an oriented layer of LC mixture containing a high amount of photoisomerisable compounds, which is subjected to radiation inducing photoisomerisation, shows a large decrease in retardation with increasing irradiation time. In such a material the retardation can be altered within a broader range of values and can be controlled more accurately, e.g. by varying the irradiation time, compared to a material showing only a slight change of retardation.

Thus, according to a preferred embodiment of the present invention, the polymerisable component of the polymerisable LC material comprises at least 12 mol % of photoisomerisable compounds, preferably cinnamate RMs, most preferably selected from formula III, IV and V.

The term 'polymerisable component' refers to the polymerisable mesogenic and non-mesogenic compounds in the total polymerisable mixture, i.e. not including other non-polymerisable components and additives like initiators, surfactants, stabilizers, solvents and the like.

Preferably the polymerisable component of the LC material comprises 12 to 100 mol %, very preferably from 40 to 100 mol %, in particular from 60 to 100 mol %, most preferably from 80 to 100 mol % of photoisomerisable compounds, preferably cinnamate RMs, most preferably selected from formula II, IV and V.

In another preferred embodiment, the polymerisable component of the LC material comprises from 20 to 99 mol %, preferably from 30 to 80 mol %, most preferably from 40 to 65 mol % of photoisomerisable compounds, preferably cinnamate RMs, most preferably selected from formula III, IV and V.

In another preferred embodiment, the polymerisable component of the LC material comprises 100 mol % photoisomerisable RMs, preferably cinnamate RMs, most preferably selected from formula III, IV and V.

The tilt angle θ of LC-molecules (directors) in the polymerised film can be determined from retardation measurements. These measurements show that, if the LC material is exposed to the photoirradiation that is used for photoisomerisation for a longer time, or to a higher radiation intensity, its original planar orientation changes into tilted or splayed orientation. Remarkably, these splayed films do not exhibit reverse tilt defects, which are normally associated with splayed LC films formed on a low pretilt substrate. Therefore, the method according to the present invention provides an elegant way of obtaining a uniform, splayed retardation film.

Thus, according to another preferred embodiment of the present invention, the orientation of the LC material in the film is controlled by varying the irradiation time and/or intensity of the photoradiation used to cause isomerisation in the LC material. This preferred embodiment also relates to a method of preparing a polymerised LC film having splayed structure, and showing a reduced number of reverse tilt defects, or even being free of tilt defects, by varying the orientation in a layer of polymerisable LC material having planar orientation as described in steps a) to e) above.

This embodiment also relates to a splayed film obtained by said method, preferably having a thickness of less than 3 μm, very preferably from 0.5 to 2.5 μm.

The optimum irradiation time and radiation intensity depend on the type of LC material used, in particular on the type and amount of photoisomerisable compounds in the LC material.

As mentioned above, the decrease in retardation of a polymerisable LC material containing for example cinnamate RMs is greater for mixtures with high concentrations of cinnamate RMs. On the other hand, irradiation of the polymerisable LC material with a high dose of UV-light leads to the formation of splayed films.

Thus, another method to control the change of retardation and orientation in the LC layer is by defining the maximum decrease of retardation achieved by photoisomerisation, whilst still maintaining the planar orientation in the LC layer, as a function of the concentration of photoisomerisable compounds.

In a polymerisable LC mixture for use in a method of preparing a film according to the present invention, where an orientation change from planar to splayed is not required, the polymerisable component preferably comprises 40 to 90 mol %, very preferably 50 to 70% of photoisomerisable cinnamate compounds of formula II, IV and/or V.

In a polymerisable LC mixture for use in a method of preparing a film according to the present invention, where an orientation change from planar to splayed is desired, the polymerisable component preferably comprises 100% of photoisomerisable cinnamate compounds of formula II, IV and/or V.

Also, a polymerisable LC mixture for use in a method of preparing a film according to the present invention, where an orientation change from planar to splayed is desired, preferably does not comprise photoisomerisable cinnamate compounds of formula III or IV wherein R is an alkyl group.

By using photomask techniques, it is possible to use the method according to this second preferred embodiment to prepare patterned films comprising regions with different orientation and/or different retardation.

Especially preferred is a film comprising at least one region having planar orientation and at least one region having splayed orientation.

Further preferred is a film comprising at least one region wherein the retardation is zero.

The method described above can also be used to prepare a multilayer comprising multiple polymerised LC films, each having with different orientation of the LC material, by a method comprising the following steps:
A) providing a first layer of a polymerisable LC material comprising at least one photoisomerisable compound onto a substrate,
B) aligning the first layer of LC material into planar orientation and polymerising the material, thereby fixing the orientation,
C) providing a second layer of LC material as described in steps A) and B), wherein the first layer serves as substrate, wherein the LC material in at least one of said first and second layers, or in selected regions thereof, before polymerisation is exposed to photoradiation that causes isomerisation of the isomerisable compound, preferably UV radiation.

Especially preferred is a multilayer comprising two or more, very preferably two, three or four polymerised LC films.

For example, a first polymerised planar LC film is produced as described above. This film is used as substrate and subsequently coated with a second layer of the same LC mixture. The second layer is then also aligned into planar orientation. Thus, a stack comprising two planar polymerised LC films can be produced. If the second layer is irradiated e.g. with UV-light of a sufficient dose prior to polymerisation, it shows splayed structure. Thus, a stack comprising a planar and a splayed polymerised LC film can be produced.

If the LC mixture in the first layer is irradiated e.g. with UV-light of a sufficient dose prior to polymerisation, the first layer shows yields a splayed LC film. If a second layer of the same LC mixture is coated onto this splayed film and irradiated prior to polymerization, the second layer forms a homeotropically aligned layer, thus a stack of splayed and homeotropic films can be produced.

Especially preferred is a multilayer comprising at least one layer having planar orientation and at least one layer having splayed orientation.

Further preferred is a multilayer comprising at least one layer having splayed orientation and at least one region having homeotropic orientation.

It is also possible to combine the above methods to prepare a film that has a pattern of regions with different orientation and regions with different retardation.

It is also possible to combine the above methods to prepare a multilayer comprising two or more layers, at least one of which has a pattern of regions with different orientation and/or with different retardation.

To prepare a polymer film, the polymerisable LC mixture is preferably coated onto a substrate, aligned, preferably into planar orientation, isomerised to create the desired retardation or orientation pattern, and polymerised in situ, for example by exposure to heat or actinic radiation, to fix the orientation of the LC molecules. Alignment and curing are carried out in the LC phase of the mixture.

In the displays and optical components according to the present invention, the polymerisable and isomerisable LC material is preferably applied onto the colour filter serving as substrate or onto an alignment layer applied onto the colour filter.

The polymerisable LC material can be applied onto the substrate by conventional coating techniques like spin-coating or blade coating. It can also be applied to the substrate by conventional printing techniques which are known to the expert, like for example screen printing, offset printing, reel-to-reel printing, letter press printing, gravure printing, rotogravure printing, flexographic printing, intaglio printing, pad printing, heat-seal printing, ink-jet printing or printing by means of a stamp or printing plate.

It is also possible to dissolve the polymerizable mesogenic material in a suitable solvent. This solution is then coated or printed onto the substrate, for example by spin-coating or printing or other known techniques, and the solvent is evaporated off before polymerization. In most cases it is suitable to heat the mixture in order to facilitate the evaporation of the solvent. As solvents for example standard organic solvents can be used. the solvents can be selected for example from ketones like e.g. acetone, methyl ethyl ketone, methyl propyl ketone or cyclohexanone, acetates like e.g. methyl, ethyl or butyl acetate or methyl acetoacetate, alcohols like e.g. methanol, ethanol or isopropyl alcohol, aromatic solvents like e.g. toluene or xylene, halogenated hydrocarbons like e.g. di- or trichloromethane, glycols or their esters like e.g. PGMEA (propyl glycol monomethyl ether acetate), γ-butyrolactone, and the like. It is also possible to use binary, ternary or higher mixtures of the above solvents.

The initial alignment (e.g. planar alignment) of the polymerisable LC material can be achieved for example by rubbing treatment of the substrate onto which the material is coated, by shearing the material during or after coating, by application of an alignment layer, by magnetic or electric field to the coated material, or by the addition of surface-active compounds to the LC material. Reviews of alignment techniques are given for example by I. Sage in "Thermotropic Liquid Crystals", edited by G. W. Gray, John Wiley & Sons, 1987, pages 75-77, and by T. Uchida and H. Seki in "Liquid Crystals—Applications and Uses Vol. 3", edited by B. Bahadur, World Scientific Publishing, Singapore 1992, pages 1-63. A review of alignment materials and techniques is given by J. Cognard, Mol. Cryst. Liq. Cryst. 78, Supplement 1 (1981), pages 1-77.

In a preferred embodiment the polymerisable LC material comprises an additive that induces or enhances planar alignment of the LC molecules on the substrate. Preferably the additive comprises one or more surfactants. Suitable surfactants are described for example in J. Cognard, Mol. Cryst. Liq. Cryst. 78, Supplement 1, 1-77 (1981). Particularly preferred are non-ionic surfactants, very fluorocarbon surfactants, like for example the commercially available fluorocarbon surfactants Fluorad FC-171® (from 3M Co.), or Zonyl FSN® (from DuPont), and the surfactants described in GB 0227108.8.

In another preferred embodiment an alignment layer is applied onto the substrate and the polymerisable LC material forming the retardation film is applied onto this alignment layer. The alignment layer induces the desired initial orientation, e.g. planar orientation, in the LC material. The LC material is then isomerised and cured as described above. Suitable alignment layers are known in the art, like for example rubbed polyimide or alignment layers prepared by photoalignment as described in U.S. Pat. Nos. 5,602,661, 5,389,698 or 6,717,644.

Polymerisation can be achieved for example by exposure to heat or actinic radiation. Actinic radiation means irradiation with light, like UV light, IR light or visible light, irradiation with X-rays or gamma rays or irradiation with high energy particles, such as ions or electrons. Preferably polymerisation is carried out by UV irradiation at a non-absorbing wavelength. As a source for actinic radiation for example a single UV lamp or a set of UV lamps can be used. When using a high lamp power the curing time can be reduced. Another possible source for actinic radiation is a laser, like e.g. a UV laser, an IR laser or a visible laser.

Polymerisation is preferably carried out in the presence of an initiator absorbing at the wavelength of the actinic radiation. For example, when polymerising by means of UV light, a photoinitiator can be used that decomposes under UV irradiation to produce free radicals or ions that start the polymerisation reaction. When curing polymerisable materials with acrylate or methacrylate groups, preferably a radical photoinitiator is used, when curing polymerisable materials with vinyl, epoxide and oxetane groups, preferably a cationic photoinitiator is used. It is also possible to use a polymerisation initiator that decomposes when heated to produce free radicals or ions that start the polymerisation. As a photoinitiator for radical polymerisation for example the commercially available Irgacure 651, Irgacure 184, Darocure 1173 or Darocure 4205 (all from Ciba Geigy AG) can be used, whereas in case of cationic photopolymerisation the commercially available UVI 6974 (Union Carbide) can be used.

The curing time is dependent, inter alia, on the reactivity of the polymerisable material, the thickness of the coated layer, the type of polymerisation initiator and the power of the UV lamp. The curing time according to the invention is preferably not longer than 10 minutes, particularly preferably not longer than 5 minutes and very particularly preferably shorter than 2 minutes. For mass production short curing times of 3 minutes or less, very preferably of 1 minute or less, in particular of 30 seconds or less, are preferred.

The mixture may also comprise one or more dyes having an absorption maximum adjusted to the wavelength of the radiation used for polymerisation, in particular UV dyes like e.g. 4,4'-azoxy anisole or the commercially available Tinuvin (from Ciba AG, Basel, Switzerland).

In another preferred embodiment the mixture of polymerisable material comprises up to 70%, preferably 1 to 50% of one or more non-mesogenic compounds with one polymerisable functional group. Typical examples are alkylacrylates or alkylmethacrylates.

It is also possible, in order to increase crosslinking of the polymers, to add up to 20% of one or more non-mesogenic compounds with two or more polymerisable functional groups to the polymerisable LC material alternatively or in addition to the di- or multifunctional polymerisable mesogenic compounds to increase crosslinking of the polymer. Typical examples for difunctional non-mesogenic monomers are alkyldiacrylates or alkyldimethacrylates with alkyl groups of 1 to 20 C atoms. Typical examples for multifunctional non-mesogenic monomers are trimethylpropanetrimethacrylate or pentaerythritoltetraacrylate.

It is also possible to add one or more chain transfer agents to the polymerisable material in order to modify the physical properties of the inventive polymer film. Especially preferred are thiol compounds, such as monofunctional thiol compounds like e.g. dodecane thiol or multifunctional thiol compounds like e.g. trimethylpropane tri(3-mercaptopropionate), very preferably mesogenic or liquid crystalline thiol compounds as for example disclosed in WO 96/12209, WO 96/25470 or U.S. Pat. No. 6,420,001. When adding a chain transfer agent, the length of the free polymer chains and/or the length of the polymer chains between two crosslinks in the inventive polymer film can be controlled. When the amount of the chain transfer agent is increased, the polymer chain length in the obtained polymer film is decreasing.

The polymerisable LC material may additionally comprise a polymeric binder or one or more monomers capable of forming a polymeric binder and/or one or more dispersion auxiliaries. Suitable binders and dispersion auxiliaries are disclosed for example in WO 96/02597. Especially preferred, however, are LC materials not containing a binder or dispersion auxiliary.

The polymerisable LC material can additionally comprise one or more other suitable components such as, for example, catalysts, sensitizers, stabilizers, inhibitors, chain-transfer agents, co-reacting monomers, surface-active compounds, lubricating agents, wetting agents, dispersing agents, hydrophobing agents, adhesive agents, flow improvers, defoaming agents, deaerators, diluents, reactive diluents, auxiliaries, colourants, dyes or pigments.

Alternatively to patterned layers as described above it is also possible to prepare a patterned film by thermal patterning, e.g. using a layer of polymerizable LC material, which does not need to contain isomerisable compounds, and polymerizing different areas at different temperatures where they have different birefringence and thus different retardation.

The examples below serve to illustrate the invention without limiting it. In these examples, all temperatures are given in degrees Celsius and all percentages are given as percentage by weight unless stated otherwise. Simulations of optical performance, like luminance, chromaticity and contrast plots, are carried out using a Berreman 4×4 matrix calculations.

EXAMPLE 1

Preparation of a Patterned QWF

The following polymerisable LC mixture is formulated

| | |
|---|---|
| (13) | 14.4% |
| (24) | 18.0% |
| (35) | 17.0% |
| (46) | 17.0% |
| (57) | 32.0% |
| Irgacure 651 | 1.0% |
| Fluorad FC171 | 0.6% |

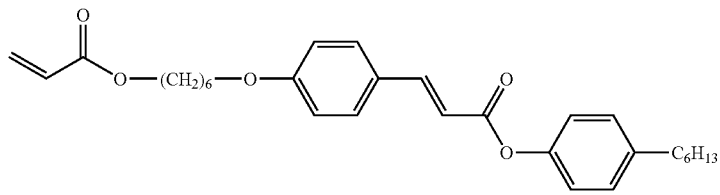

(1)

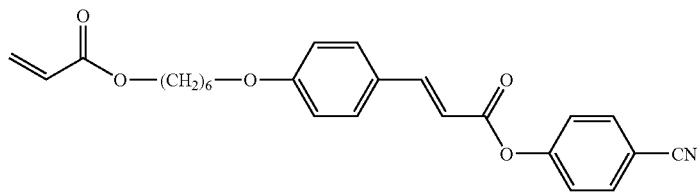

(2)

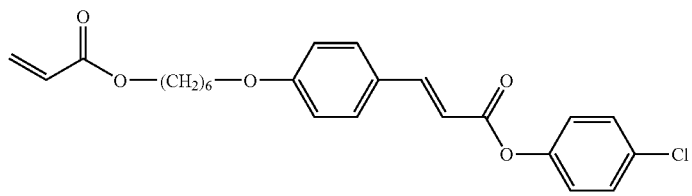

(3)

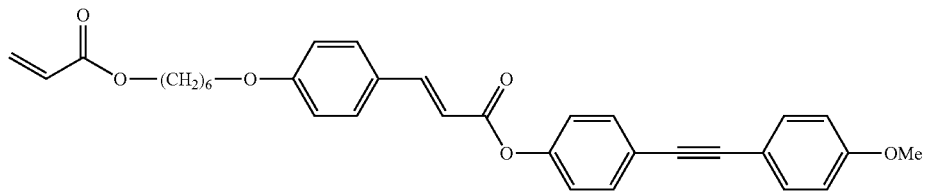

(4)

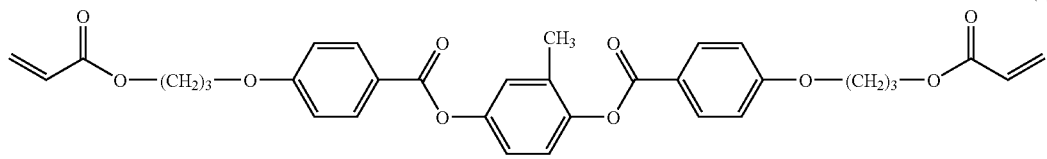

(5)

Compounds (1) to (5) are described in prior art. Irgacure 651 is a commercially available photoinitiator (from Ciba AG, Basel, Switzerland). Fluorad FC 171 is a commercially available non-ionic fluorocarbon surfactant (from 3M).

The mixture is dissolved to create a 50 wt % solution in xylene. This solution is filtered (0.2 μm PTFE membrane) and spin coated onto a glass/rubbed polyimide slide (low pretilt polyimide JSR AL1054 from Japan Synthetic Rubber). The coated film is exposed to 20 mWcm$^{-2}$ 313 nm radiation in air through a grey-scale (0:50:100% T) mask.

Subsequently, the film is photopolymerised using 20 mWcm$^{-2}$ UV-A radiation, for 60 seconds in an N$_2$-atmosphere, to give a patterned film having a pattern of regions with different retardations.

EXAMPLE 2 (COMPARISON EXAMPLE)

Transflective VA Display with Two QWFs and Two HWFs

The optical performance of a transflective VA LCD with a stack of optical layers as shown in FIG. 2 is calculated. The parameters of the components are as follows:

| | |
|---|---|
| Front polariser direction: | +45° |
| Back polariser direction: | −45° |
| Retardation of LC (reflective subpixel): | 240 nm |
| Retardation of LC (transmissive subpixel): | 480 nm |
| Optical axis of front QWF: | −30° |
| Optical axis of back QWF: | +60° |
| Retardation of front/back QWF: | 138 nm |
| Optical axis of front HWF: | +30° |
| Optical axis of back HWF: | −60° |
| Retardation of front/back HWF: | 275 nm |

Figure 8A:
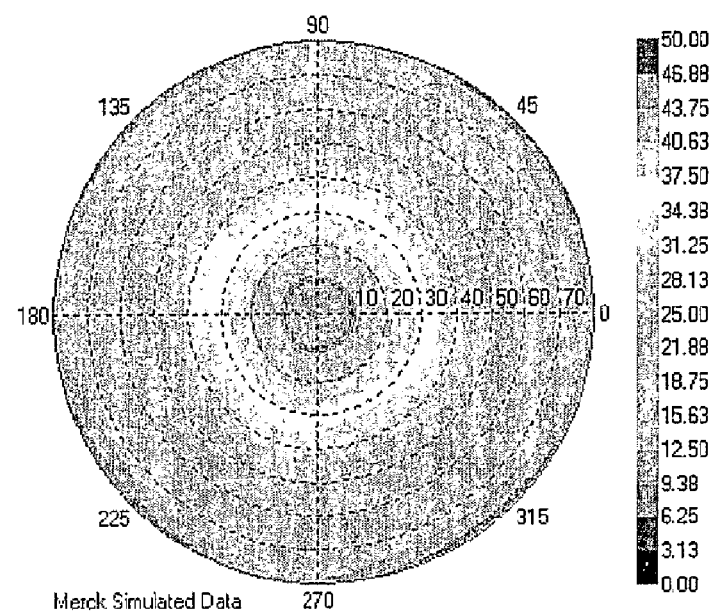
FIGS. 8, 9 and 10 show the calculated angular luminance, bright state chromaticity and angular contrast for a transflective VA-LCD according to example 2 (prior art) in the transmissive mode (A) and reflective mode (B).
Figure 8B:
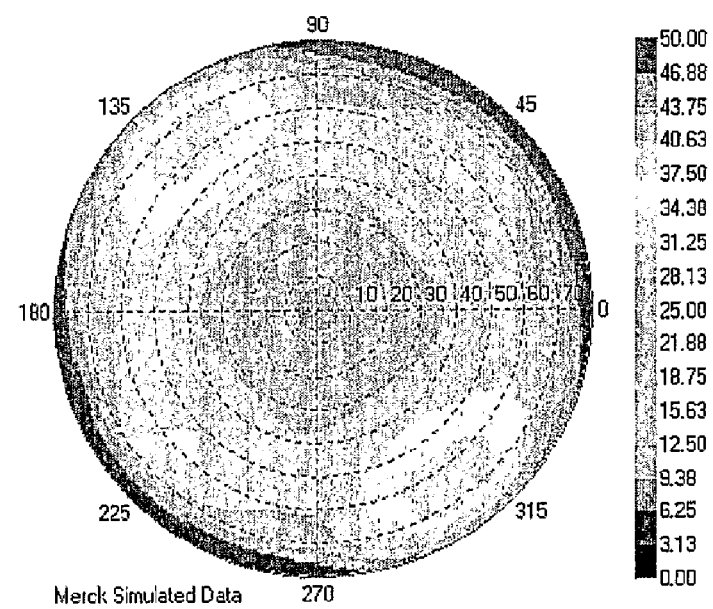

The angular luminance of the transmissive and reflective subpixels are shown in FIG. 8A/B. The on-axis luminance is 45.4% (transmissive) and 44.0% (reflective).

Figure 9A:
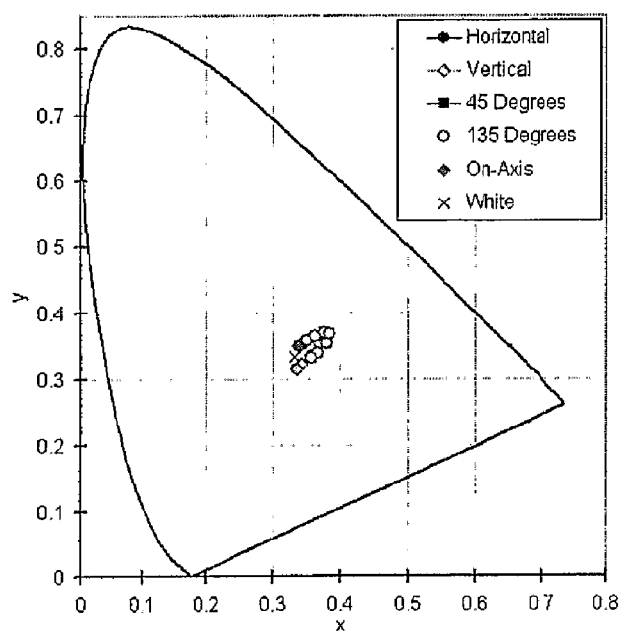
Figure 9B:
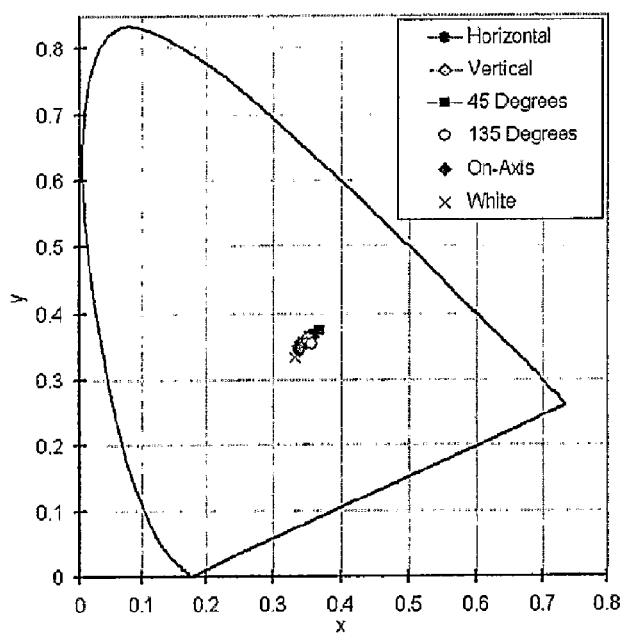

The bright state chromaticity plot of the reflective and transmissive subpixels are shown in FIG. 9A/B. The chromaticity is 10.7% (transmissive) and 7.3% (reflective).

Figure 10A:
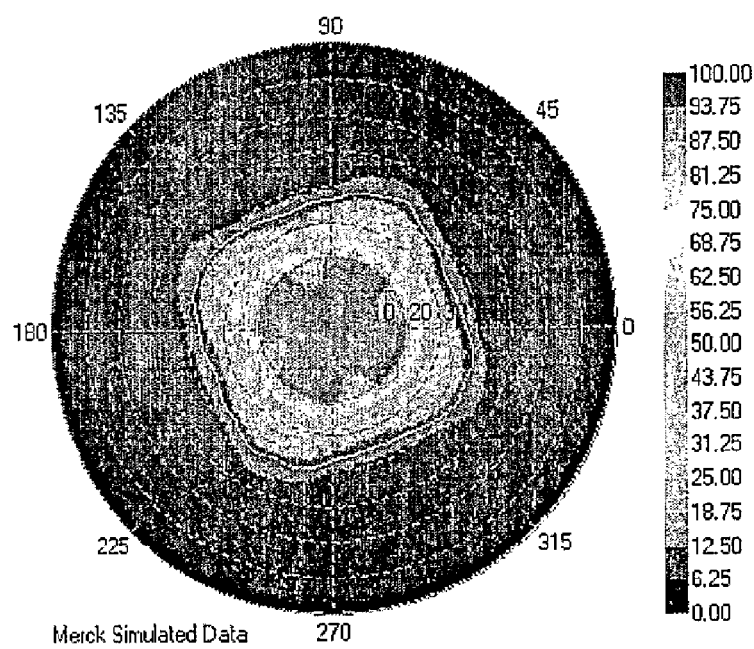
Figure 10B:
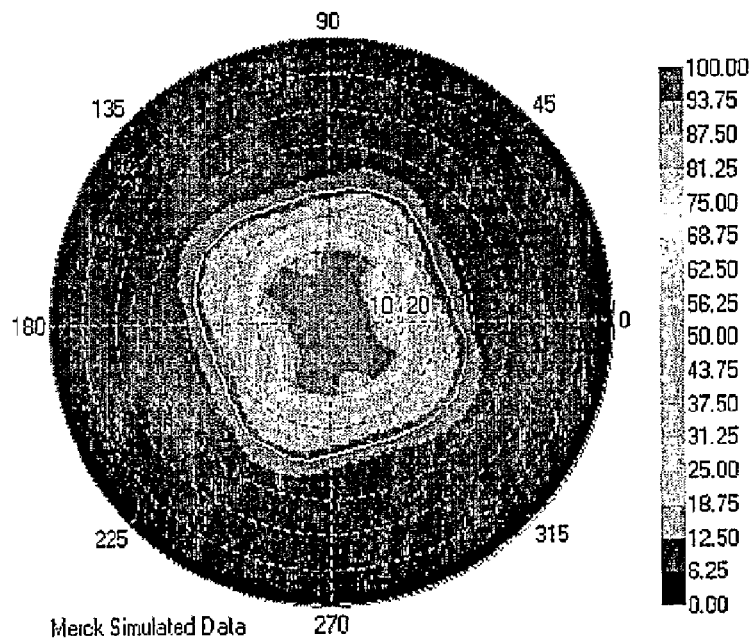

The on-axis contrast of the transmissive and reflective subpixels are shown in FIG. 10A/B.

EXAMPLES 3-8

Transflective VA Display with a Patterned Incell QWF

In the displays of examples 3-8, the viewing angle is dramatically increased in the transmissive mode by virtue of the fact that circularly polarised light is no longer required. This also allows for the use of viewing angle enhancement films, to expand it still further.

EXAMPLE 3

The optical performance of a pixelated transflective VA LCD according to the present invention with a stack of optical layers as shown in FIG. 3 is calculated. The parameters of the components are as follows:

| | |
|---|---|
| Front polariser direction: | 0° |
| Back polariser direction: | +90° |
| Retardation of LC (reflective subpixel): | 240 nm |
| Retardation of LC (transmissive subpixel): | 480 nm |
| Optical axis of incell QWF (reflective subpixel): | +45° |
| Retardation of incell QWF (reflective subpixel): | 138 nm |

The patterned incell QWF can be made for example as described in Example 1.

Figure 11A:
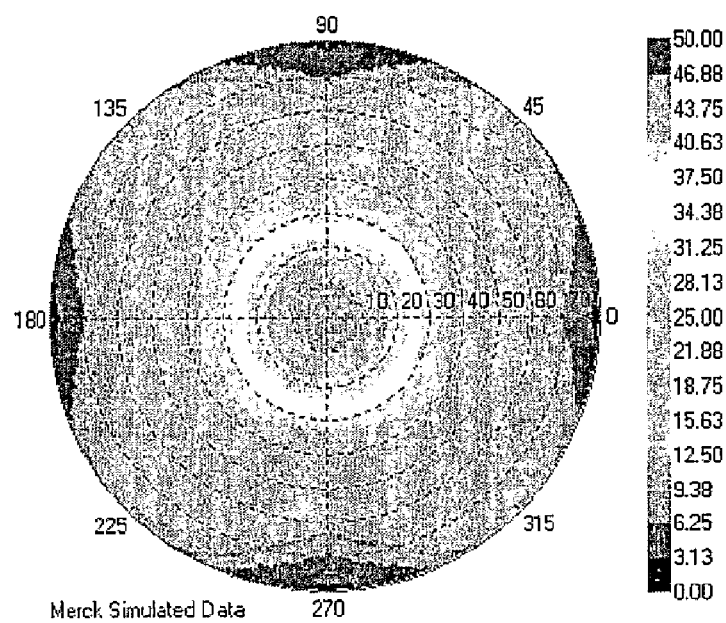
FIGS. 11-25 show the calculated angular luminance, bright state chromaticity and angular contrast for transflective VA-LCDs according to examples 3-7 of the present invention in the transmissive mode (A) and reflective mode (B).
Figure 11B:
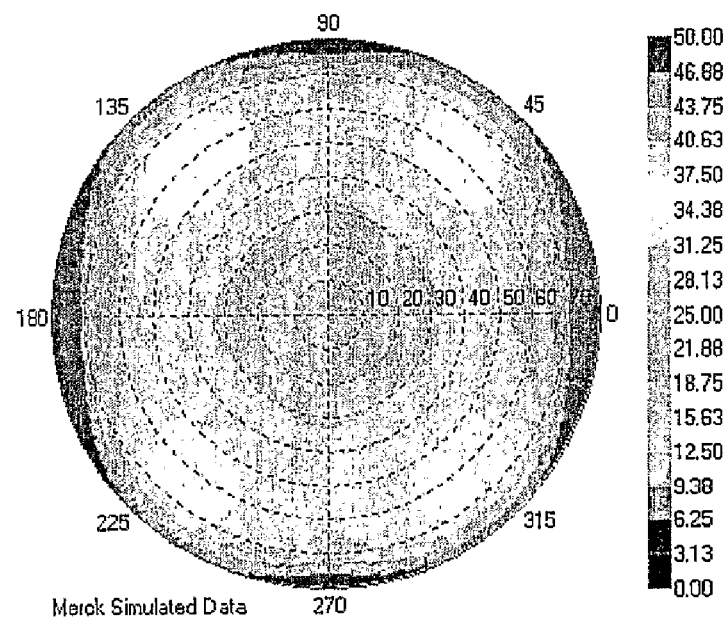

The angular luminance of the transmissive and reflective subpixels are shown in FIG. 11A/B. The on-axis luminance is 45.2% (transmissive) and 43.4% (reflective).

Figure 12A:
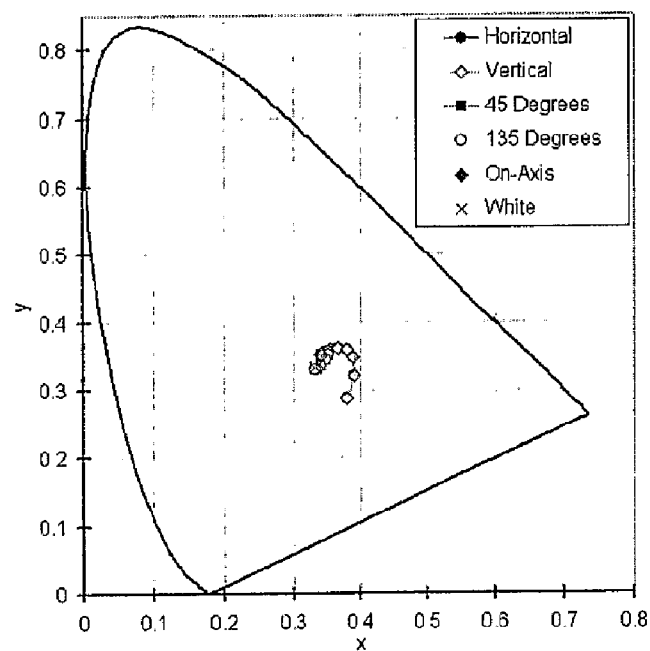
Figure 12B:
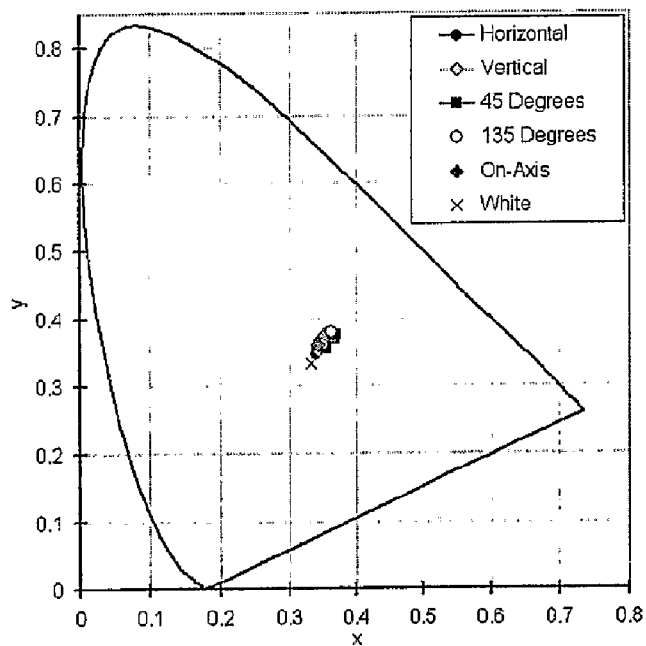

The bright state chromaticity plot of the transmissive and reflective subpixels are shown in FIG. 12 A/B. The chromaticity is 9.5% (transmissive) and 10.6% (reflective).

Figure 13A:
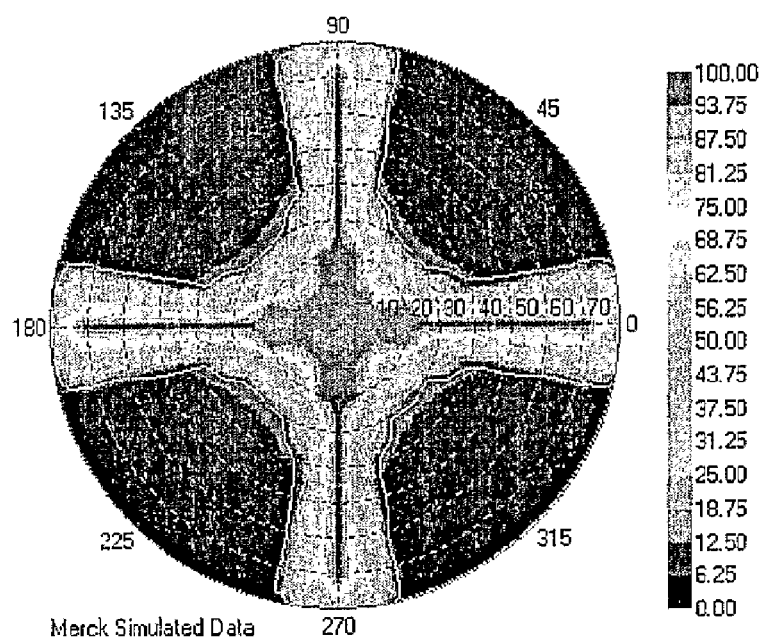
Figure 13B:
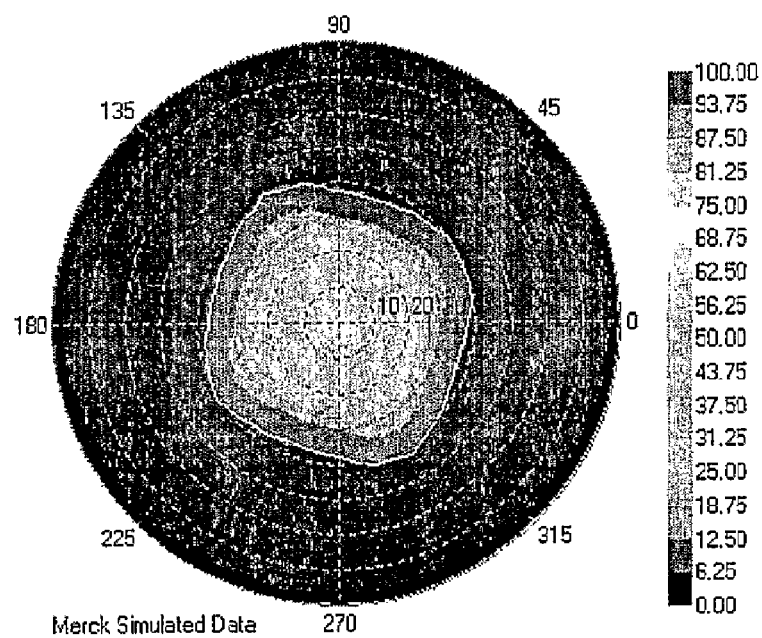

The on-axis contrast of the transmissive and reflective subpixels are shown in FIG. 13 A/B.

EXAMPLE 4

The optical performance of a pixelated transflective VA LCD according to the present invention with a stack of optical layers as shown in FIG. 4 is calculated. The parameters of the components are as follows:

| | |
|---|---|
| Front polariser direction: | +30° |
| Back polariser direction: | +90° |
| Retardation of LC (reflective subpixel): | 240 nm |
| Retardation of LC (transmissive subpixel): | 480 nm |
| Optical axis of incell QWF (reflective subpixel): | −45° |
| Retardation of incell QWF (reflective subpixel): | 138 nm |
| Optical axis of front HWF: | +15° |
| Retardation of front HWF: | 275 nm |

The patterned incell QWF can be made for example as described in Example 1.

Figure 14A:
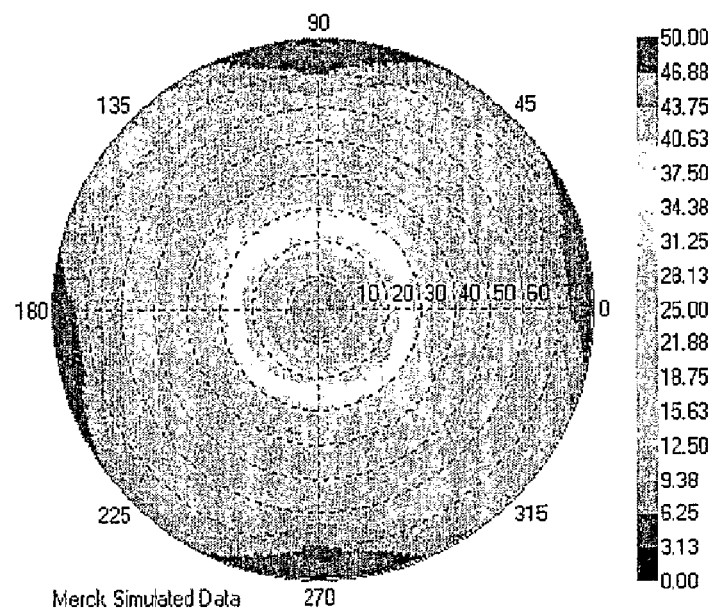
Figure 14B:
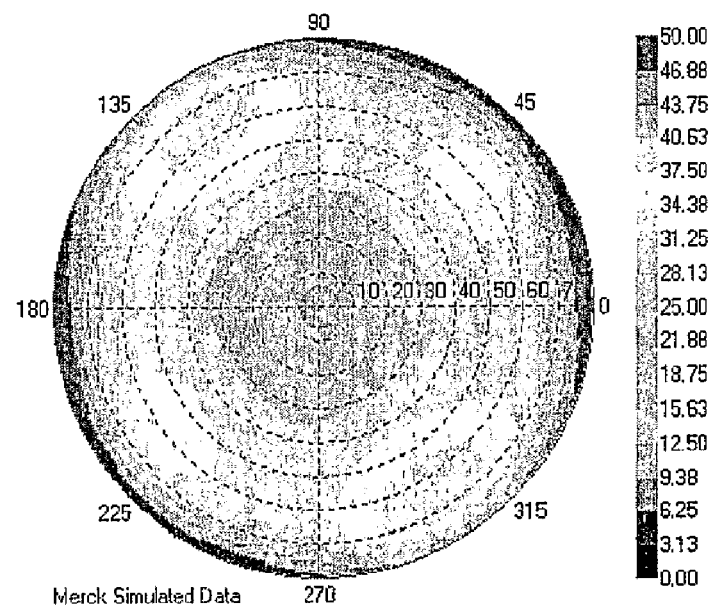

The angular luminance of the transmissive and reflective subpixels are shown in FIG. 14 A/B. The on-axis luminance is 45.1% (transmissive) and 44.0% (reflective).

Figure 15A:
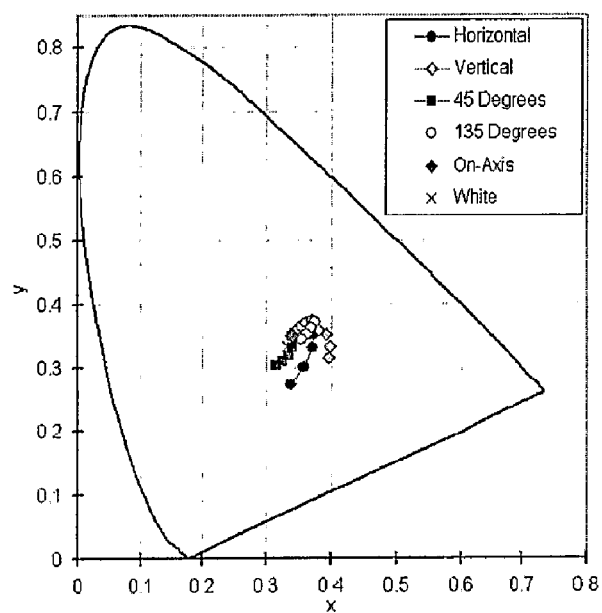
Figure 15B:
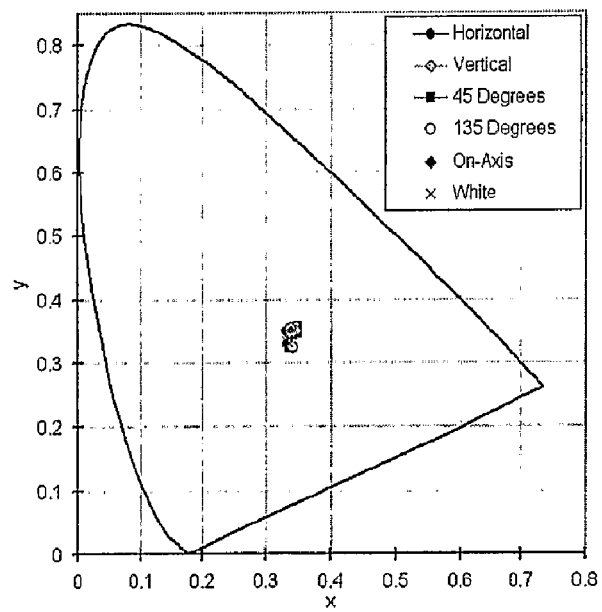

The bright state chromaticity plot of the transmissive and reflective subpixels are shown in FIG. 15 A/B. The chromaticity is 9.5% (transmissive) and 7.0% (reflective).

Figure 16A:
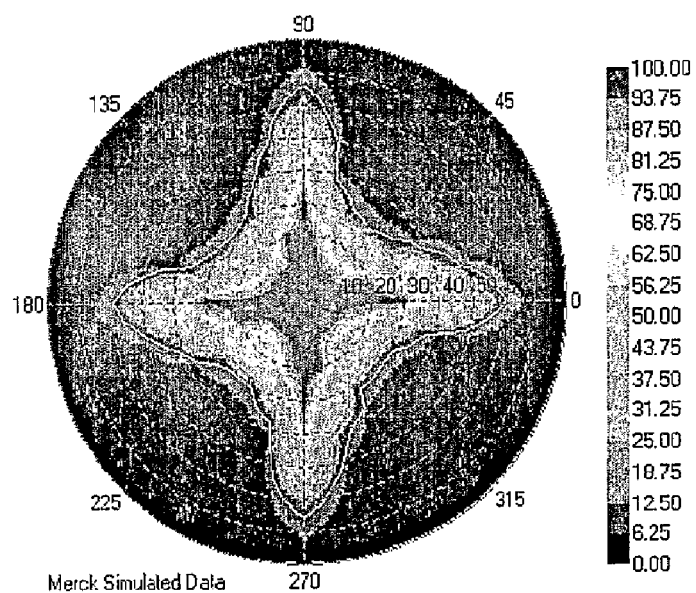
Figure 16B:
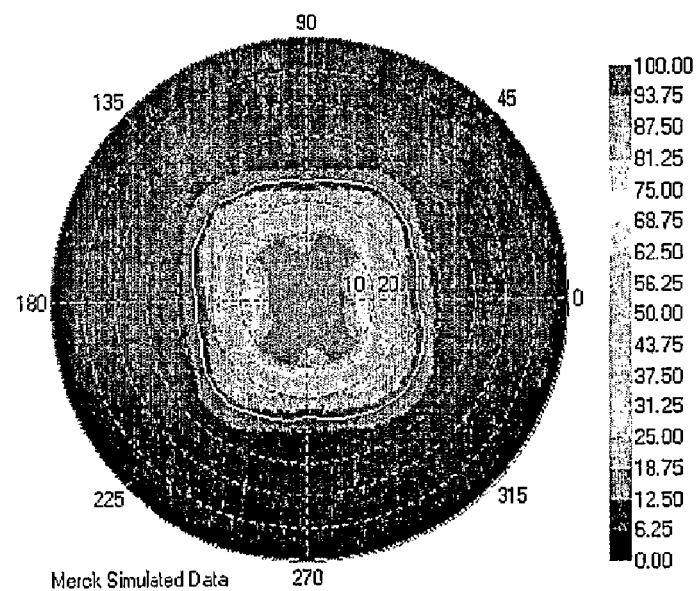

The on-axis contrast of the transmissive and reflective subpixels are shown in FIG. 16 A/B.

EXAMPLE 5

The optical performance of a pixelated transflective VA LCD according to the present invention with a stack of optical layers as shown in FIG. 5 is calculated. The parameters of the components are as follows:

| | |
|---|---|
| Front polariser direction: | +30° |
| Back polariser direction: | −60° |
| Retardation of LC (reflective subpixel): | 240 nm |
| Retardation of LC (transmissive subpixel): | 480 nm |
| Optical axis of incell QWF (reflective subpixel): | −45° |
| Retardation of incell QWF (reflective subpixel): | 138 nm |
| Optical axis of front HWF: | +15° |
| Optical axis of back HWF: | −75° |
| Retardation of front/back HWF: | 275 nm |

The patterned incell QWF can be made for example as described in Example 1.

Figure 17A:
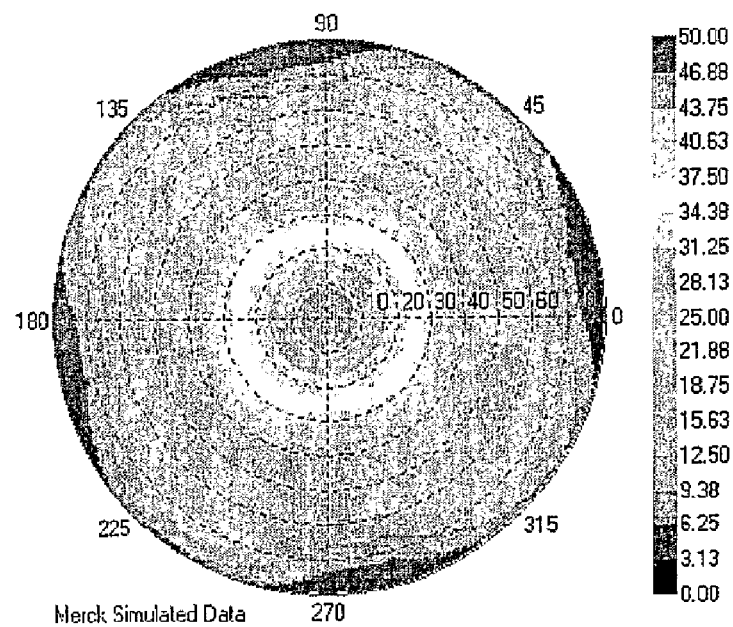
Figure 17B:
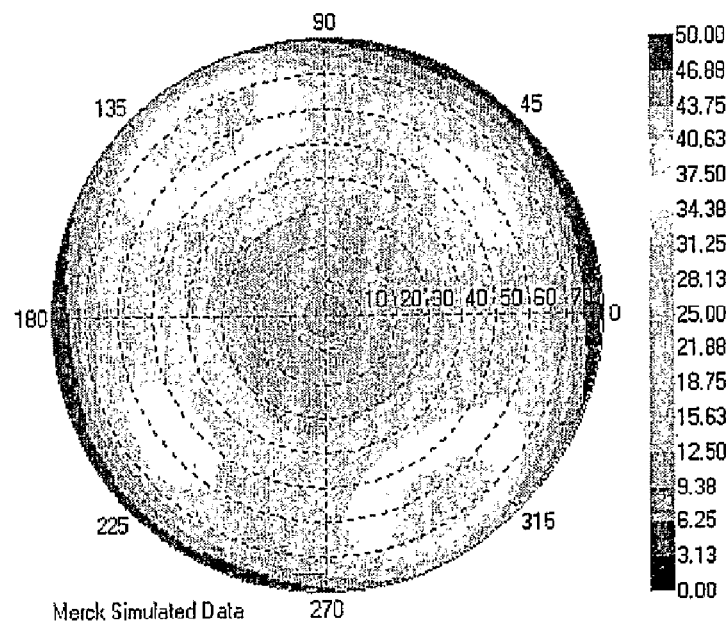

The angular luminance of the transmissive and reflective subpixels are shown in FIG. 17 A/B. The on-axis luminance is 45.7% (transmissive) and 44.0% (reflective).

Figure 18A:
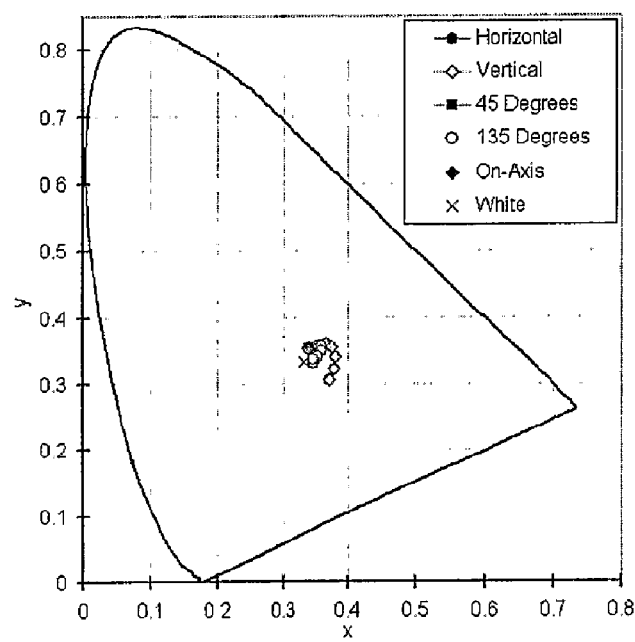
Figure 18B:
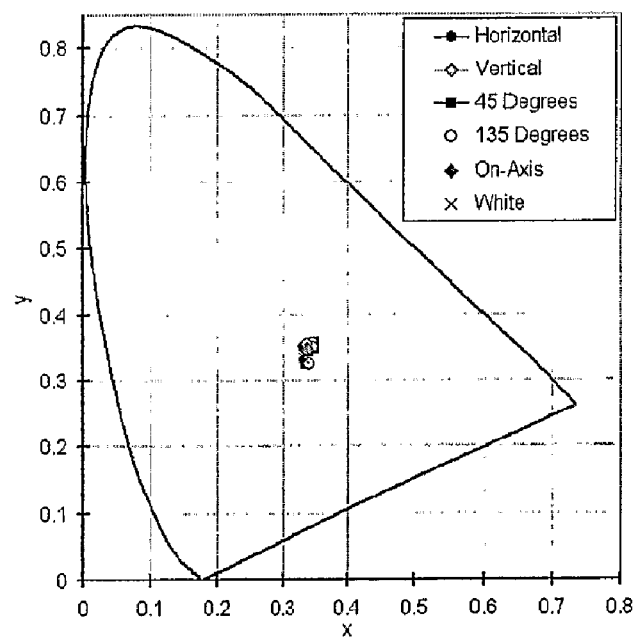

The bright state chromaticity plot of the transmissive and reflective subpixels are shown in FIG. 18 A/B. The chromaticity is 8.8% (transmissive) and 7.0% (reflective).

Figure 19A:
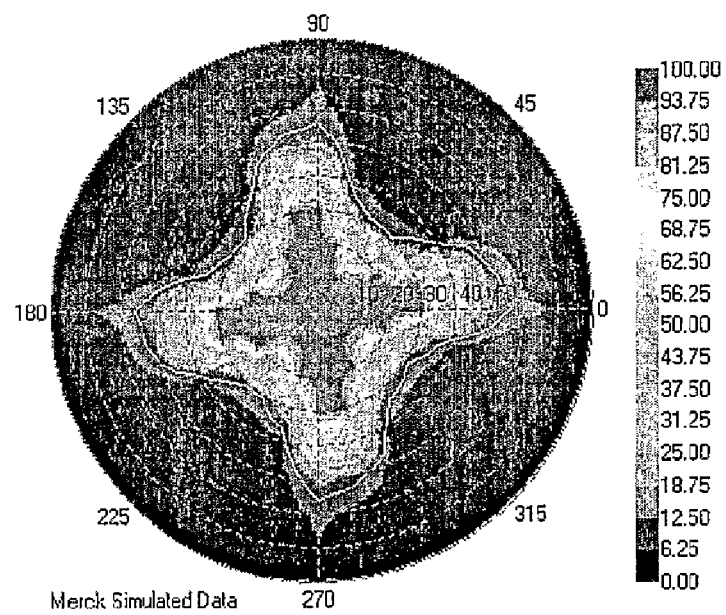
Figure 19B:
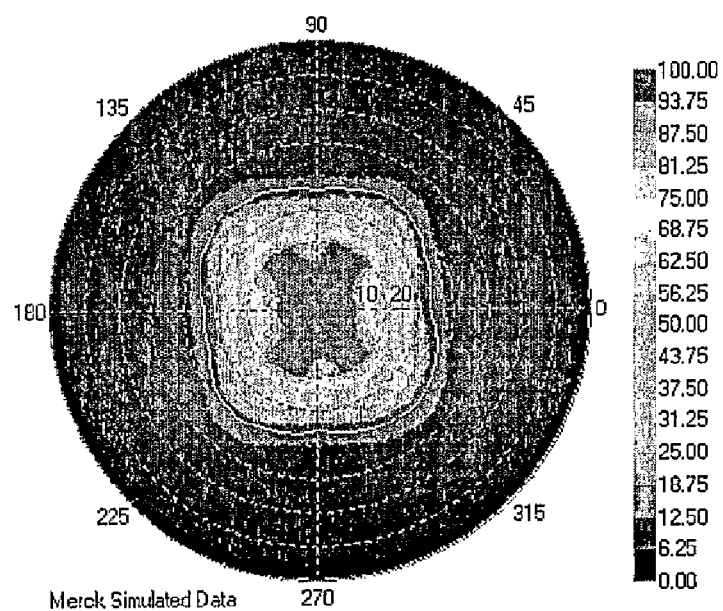

The on-axis contrast of the transmissive and reflective subpixels are shown in FIG. 19 A/B.

EXAMPLE 6

The optical performance of a pixelated transflective VA LCD according to the present invention with a stack of optical layers as shown in FIG. 6 is calculated.

The parameters of the components are as follows:

| | |
|---|---|
| Front polariser direction: | 0° |
| Back polariser direction: | +90° |
| Retardation of LC (reflective subpixel): | 240 nm |
| Retardation of LC (transmissive subpixel): | 480 nm |
| Optical axis of incell QWF (reflective subpixel): | +75° |
| Retardation of incell QWF (reflective subpixel): | 138 nm |
| Optical axis of incell HWF (reflective subpixel): | +15° |
| Retardation of incell HWF (reflective subpixel): | 275 nm |

The patterned incell QWF and HWF can be made for example as described in Example 1.

Figure 20A:
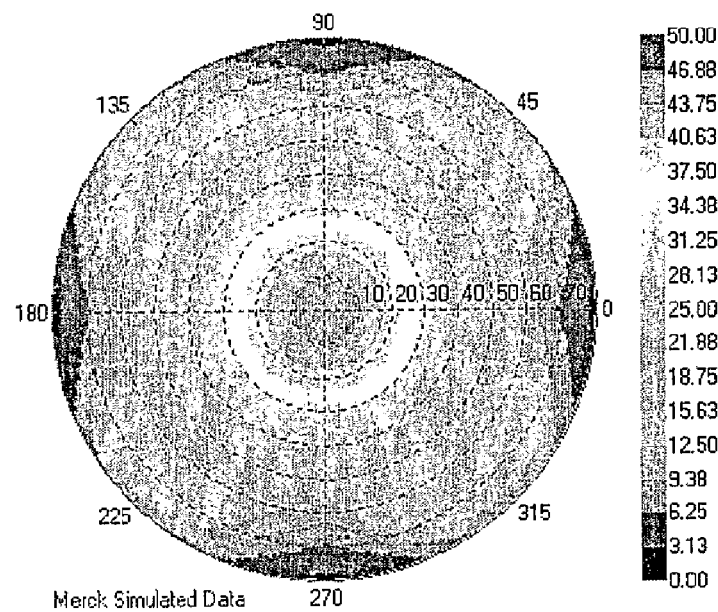
Figure 20B:
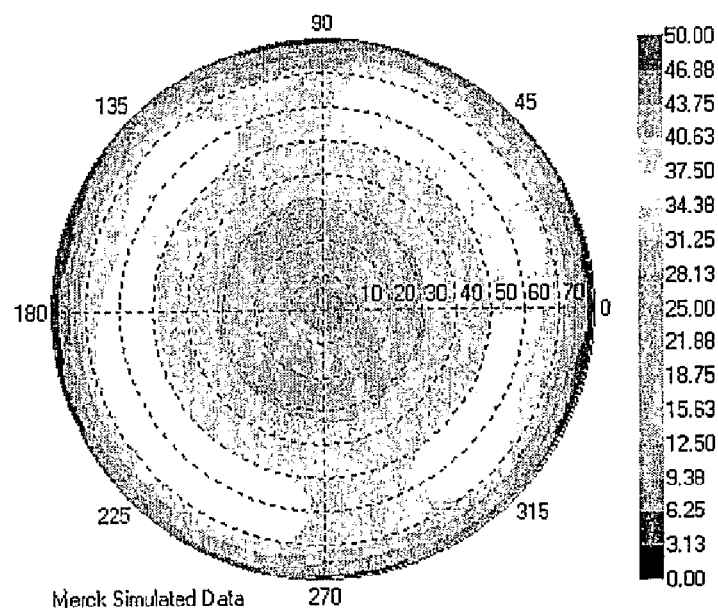

The angular luminance of the reflective and transmissive subpixels are shown in FIG. 20. The on-axis luminance is 45.2% (reflective) and 43.4% (transmissive).

Figure 21A:
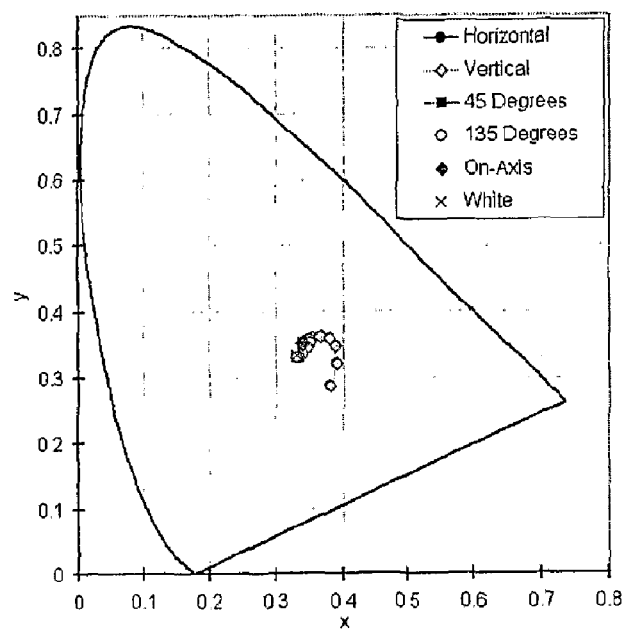
Figure 21B:
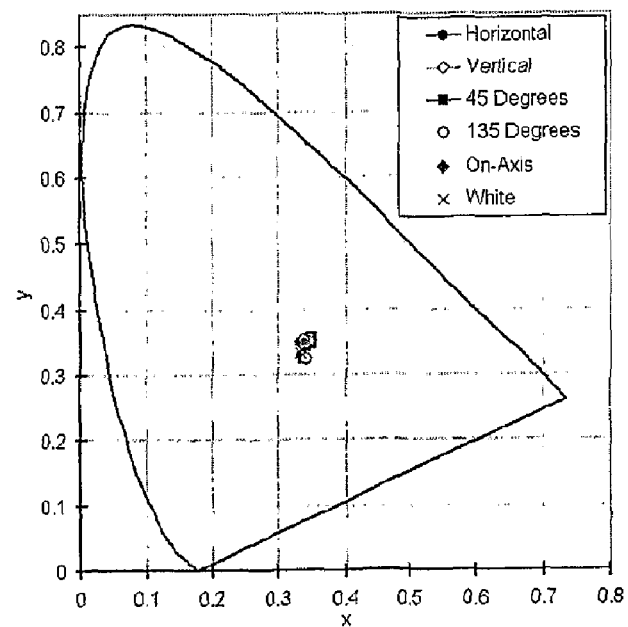

The bright state chromaticity plot of the transmissive and reflective subpixels are shown in FIG. 21 A/B. The chromaticity is 9.5% (transmissive) and 10.6% (reflective).

Figure 22A:
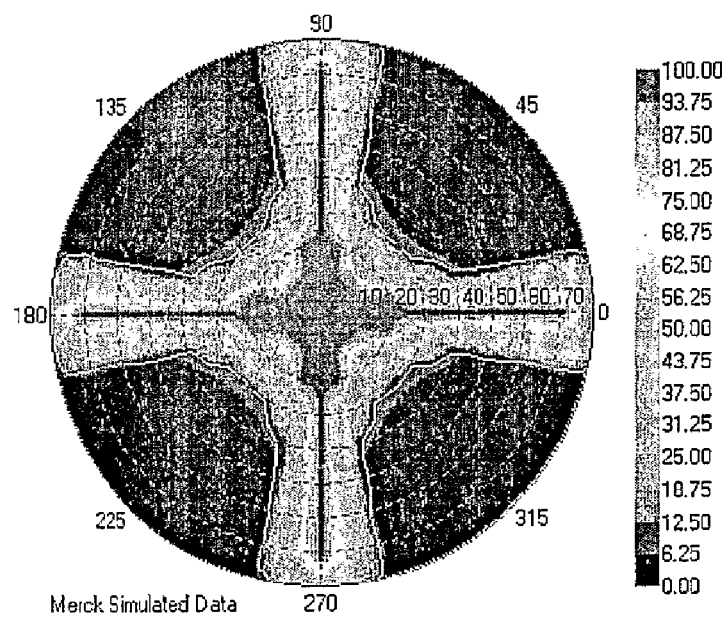
Figure 22B:
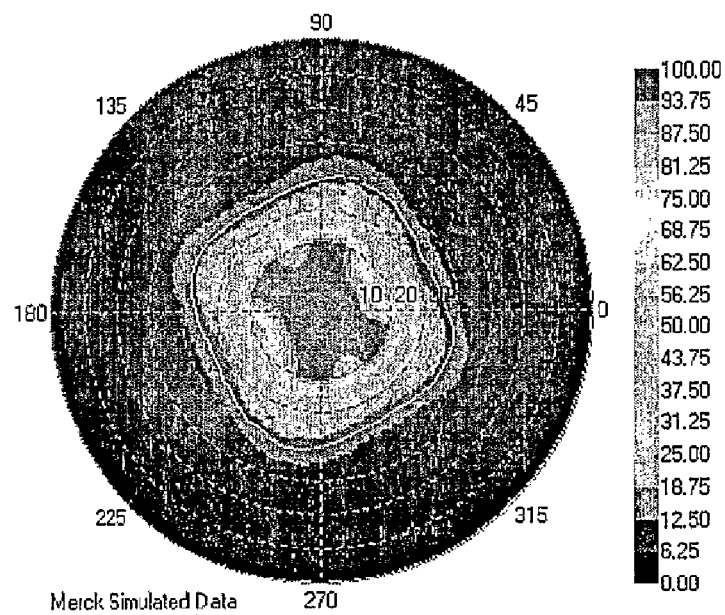

The on-axis contrast of the transmissive and reflective subpixels are shown in FIG. 22 A/B.

EXAMPLE 7

The optical performance of a pixelated transflective VA LCD according to the present invention, with a stack of optical layers as shown in FIG. 7 is calculated.

The parameters of the components are as follows:

| | |
|---|---|
| Front polariser direction: | 0° |
| Back polariser direction: | +90° |
| Retardation of LC (reflective subpixel): | 240 nm |
| Retardation of LC (transmissive subpixel): | 480 nm |
| Optical axis of incell QWF (reflective subpixel) | +75° |
| Retardation of incell QWF (reflective subpixel): | 138 nm |
| Optical axis of incell HWF (reflective subpixel): | +15° |
| Retardation of incell HWF (reflective subpixel): | 275 nm |
| Retardation of −C-plate: | −325 nm |
| Optical axis of +A-plate: | 0° |
| Retardation of +A-plate: | 138 nm |

The patterned incell QWF and HWF can be made for example as described in Example 1.

Figure 23A:
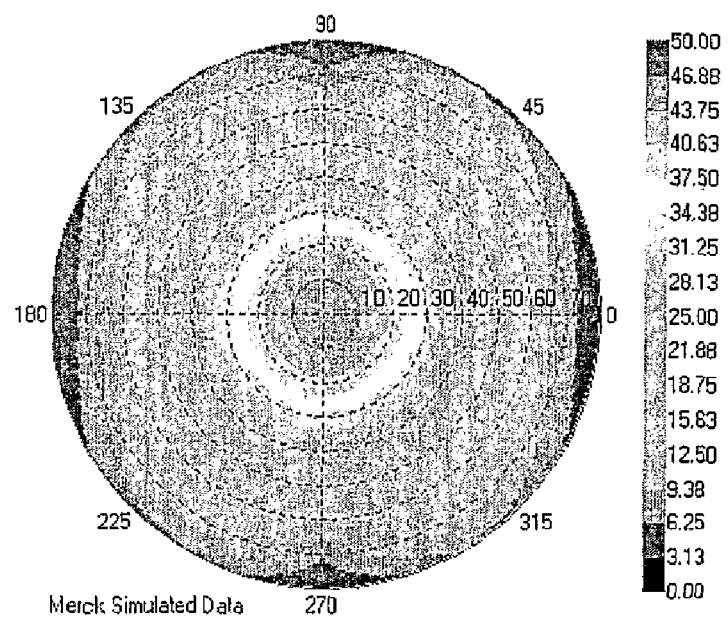
Figure 23B:
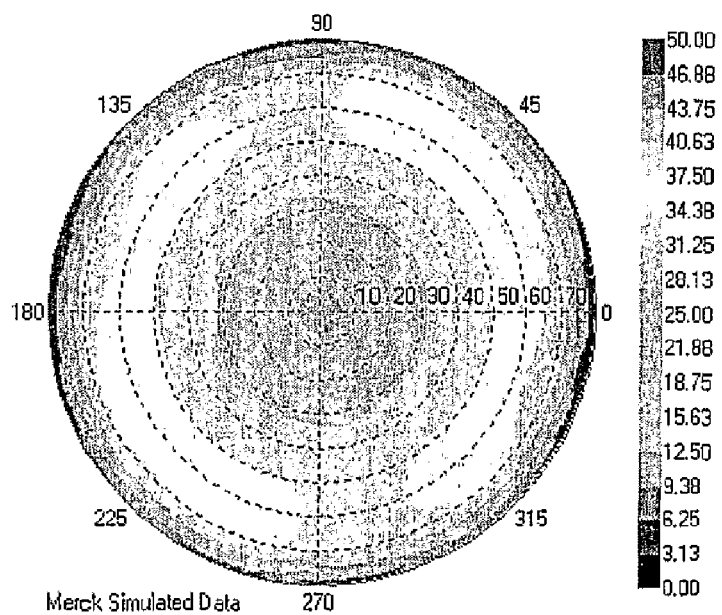

The angular luminance of the transmissive and reflective subpixels are shown in FIG. 23 A/B. The on-axis luminance is 45.4% (transmissive) and 43.4% (reflective).

Figure 24A:
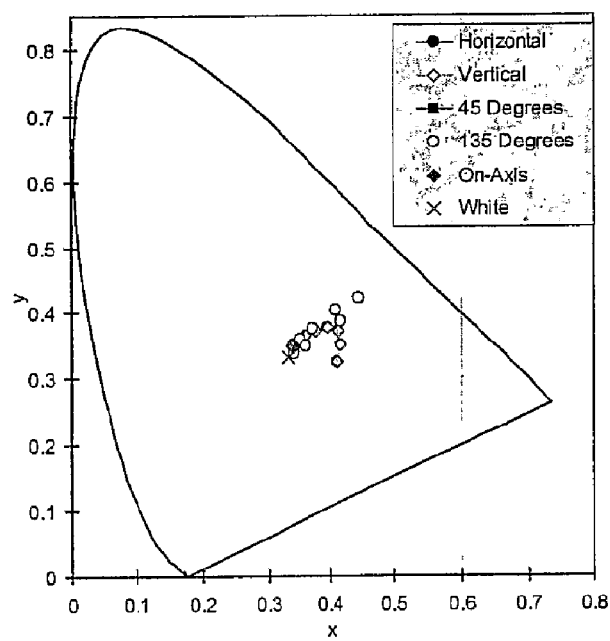
Figure 24B:
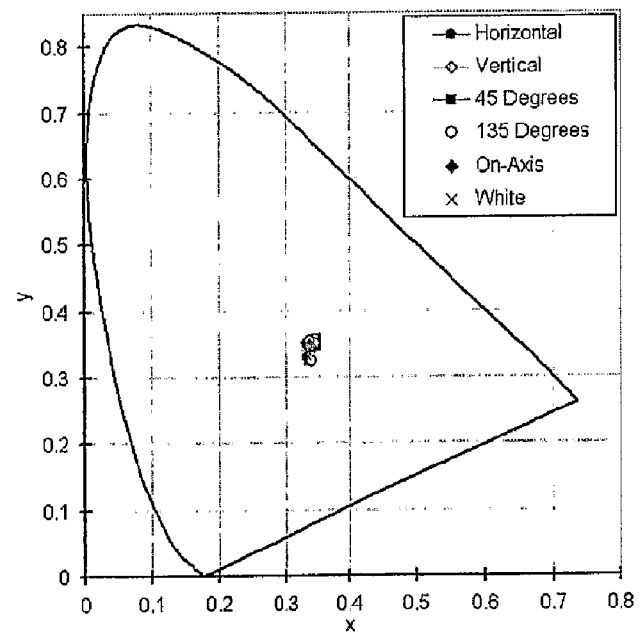

The bright state chromaticity plot of the transmissive and reflective subpixels are shown in FIG. 24 A/B. The chromaticity is 14.0% (transmissive) and 10.6% (reflective).

Figure 25A:
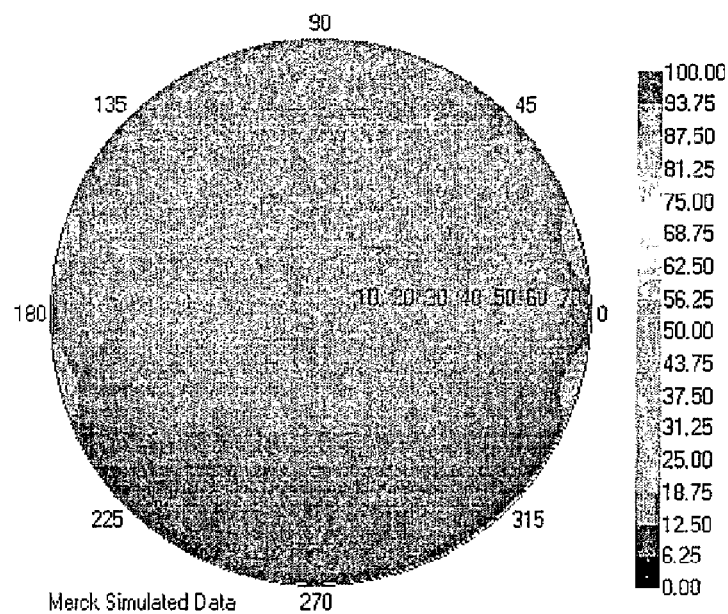
Figure 25B:
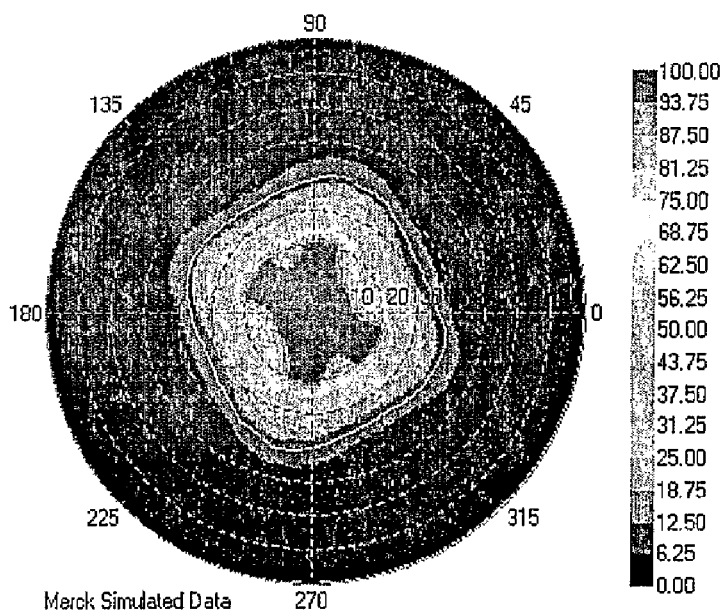

The on-axis contrast of the transmissive and reflective subpixels are shown in FIG. 25 A/B.

The invention claimed is:

1. A transflective vertically aligned (VA) liquid crystal display (LCD) comprising one or more pixels that are divided into a reflective subpixel and a transmissive subpixel and comprise
   an LC cell comprising front and back electrode layers sandwiching an LC layer that is switchable between different orientations upon application of an electric field,
   front and back polarizers sandwiching the LC cell and having front and back polarization directions,
   and
   at least one quarter wave retardation (QWF) film being positioned between the front polariser and the LC layer, present in both reflective and transmissive areas of the LCD, having a pattern of regions with quarter wave (λ/4) on-axis retardation and regions with substantially no on-axis retardation, and being arranged such that the λ/4-regions do essentially cover only the reflective subpixels.

2. The LCD according to claim 1, comprising
   a liquid crystal (LC) cell having a the following elements
   a first and a second substrate plane parallel to each other, at least one of which is transparent to incident light,
   an array of nonlinear electric elements on one of said substrates which can be used to individually switch individual pixels of said LC cell,
   a color filter array provided on one of said substrates, and having a pattern of different pixels transmitting one of the primary colors red, green and blue (R, G, B), said color filter optionally being covered by a planarization layer,
   a first electrode layer provided on the inside of said first substrate,
   optionally a second electrode layer provided on the inside of said second substrate,
   optionally first and second alignment layers provided on said first and second electrodes,
   an LC medium that is switchable between at least two different orientations by application of an electric field,
   a first linear polarizer on the first side of the LC cell,
   a second linear polarizer on the second side of the LC cell, and
   at least one QWF.

3. The LCD according to claim 1, wherein the QWF is positioned between the first or second substrate and the LC medium (incell).

4. The LCD according to claim 1, wherein the QWF is positioned between the color filter and a proximate electrode.

5. The LCD according to claim 1, wherein the thickness of the QWF is from 0.5 to 3.5 microns.

6. The LCD according to claim 1, wherein the on-axis retardation of the QWF is from 100 to 175 nm.

7. The LCD according to claim 1, wherein the QWF is an achromatic QWF (AQWF).

8. The LCD according to claim 1, wherein it additionally comprising a half wave retardation film (HWF) and/or QWF outside the LC cell.

9. The LCD according to claim 1, additionally comprising at least one A-plate and/or at least one C-plate retarder.

10. The LCD according to claim 1, comprising a color filter having a pattern of R-, G-, B-pixels, wherein the QWF exhibits a pattern of R-, G- and B-pixels having different retardation that is adjusted such that the efficiency of converting linearly polarized light into circularly polarized light is optimised for the color R, G and B, respectively, said QWF being positioned such that each of its R-, G- and B-pixels covers the corresponding R-, G- and B-pixels of the color filter.

11. A patterned QWF having a pattern of regions with quarter wave (λ/4) retardation and regions with substantially no retardation.

12. The LCD of claim 1, wherein the electrodes are provided on the inside of transparent substrates.

13. The LCD of claim 2, wherein the array of non-linear electric elements are transistors.

14. The LCD of claim 2, wherein the QWF film is a continuous film with retarding regions and non-retarding regions.

15. The display of claim 1, wherein in the retarding regions of the QWF the optical axis is parallel to the film.

16. The display of claim 1, wherein the regions of the QWF having no on-axis retardation comprise an optically isotropic material.

17. The display of claim 1, wherein the regions of the QWF having no on-axis retardation have an optical axis perpendicular to the film plane.

18. The display of claim 1, which is a multi-domain VA (MVA) display.

19. The display of claim 1, wherein the QWF comprises a polymerized LC material.

20. The display of claim 19, wherein the QWF is prepared from a polymerizable LC material comprising a photoisomerisable compound.

21. The display of claim 20, wherein the QWF is prepared by a process comprising
   a) providing a layer of a polymerizable LC material comprising at least one photoisomerizable compound onto a substrate,
   b) aligning the layer of LC material into planar orientation,
   c) exposing the LC material in the layer, or in selected regions thereof, to photoradiation that causes isomerization of the isomerizable compound,
   d) polymerizing the LC material in at least a part of the exposed regions of the material, thereby fixing the orientation, and
   e) optionally removing the polymerized film from the substrate,
   wherein the retardation and/or orientation of the LC material is controlled by varying the amount and/or type of the photoisomerizable compound, and/or by varying the intensity of the photoradiation and/or the exposure time.

* * * * *